US011009489B2

(12) United States Patent
Dryden et al.

(10) Patent No.: US 11,009,489 B2
(45) Date of Patent: May 18, 2021

(54) METHOD AND SYSTEM FOR REDUCING THE EFFECTS OF COLUMN BLEED CARRYOVER

(71) Applicant: Agilent Technologies, Inc., Santa Clara, CA (US)

(72) Inventors: Paul C. Dryden, Lincoln University, PA (US); Sammye Elizabeth Traudt, Middletown, DE (US); Robert C. Henderson, Avondale, PA (US)

(73) Assignee: Agilent Technologies, Inc., Santa Clara, CA (US)

(*) Notice: Subject to any disclaimer, the term of this patent is extended or adjusted under 35 U.S.C. 154(b) by 320 days.

(21) Appl. No.: 16/314,415

(22) PCT Filed: Jun. 29, 2016

(86) PCT No.: PCT/US2016/040103
§ 371 (c)(1),
(2) Date: Dec. 29, 2018

(87) PCT Pub. No.: WO2018/004570
PCT Pub. Date: Jan. 4, 2018

(65) Prior Publication Data
US 2019/0170708 A1    Jun. 6, 2019

(51) Int. Cl.
*G01N 30/30*   (2006.01)
*G01N 30/54*   (2006.01)
(Continued)

(52) U.S. Cl.
CPC ............ *G01N 30/30* (2013.01); *G01N 30/16* (2013.01); *G01N 30/32* (2013.01); *G01N 30/54* (2013.01);
(Continued)

(58) Field of Classification Search
CPC .................. G01N 30/30; G01N 30/54; G01N 2030/3007; G01N 2030/3015;
(Continued)

(56) References Cited

U.S. PATENT DOCUMENTS 5,005,399 A    4/1991   Holtzclaw et al.
5,268,302 A *  12/1993  Rounbehler ........... G01N 30/84
                                                    422/88
(Continued)

FOREIGN PATENT DOCUMENTS

EP      0872732 A1    10/1998
JP   2008544257 A     12/2008
(Continued)

OTHER PUBLICATIONS

Haglund, Peter et al., Effects of temperature and flow regulated carbon dioxide cooling in longitudinally modulated cryogenic systems for comprehensive two-dimensional gas chromatography, Journal of Chromatography A, 2002, vol. 962, pp. 127-134.
(Continued)

*Primary Examiner* — Herbert K Roberts

(57) ABSTRACT

In gas chromatography (GC), a sample is introduced into a flow of carrier gas and the mixture is driven through a heated GC column to acquire chromatographic data from the sample. During this time, the column is heated from an initial temperature to a final temperature. Subsequently, the column is cooled according to a cooling program. The cooling program may include a first cooling ramp, a subsequent isothermal hold, and a subsequent second cooling ramp. Alternatively, while the column is cooled down the flow of carrier gas through the column may be slowed down or ceased for a period of time, after which the flow of carrier gas through the column may be resumed at the original flow rate in preparation for processing another sample. Controlling column temperature and/or flow in this manner may be
(Continued)

effective for reducing column bleed carryover and/or the effects thereof.

19 Claims, 12 Drawing Sheets

(51) Int. Cl.
*G01N 30/86* (2006.01)
*G01N 30/16* (2006.01)
*G01N 30/32* (2006.01)
*G01N 30/02* (2006.01)

(52) U.S. Cl.
CPC ... *G01N 30/8658* (2013.01); *G01N 2030/025* (2013.01); *G01N 2030/167* (2013.01); *G01N 2030/3076* (2013.01); *G01N 2030/324* (2013.01)

(58) Field of Classification Search
CPC ..... G01N 2030/3023; G01N 2030/303; G01N 2030/3038; G01N 2030/3046; G01N 2030/3053; G01N 2030/3061; G01N 2030/3069; G01N 2030/3076; G01N 2030/3084; G01N 2030/3092
See application file for complete search history.

(56) References Cited

U.S. PATENT DOCUMENTS

| | | |
|---|---|---|
| 5,634,961 A | 6/1997 | Gordon |
| 7,291,203 B2 | 11/2007 | Crnko et al. |
| 7,534,286 B2 | 5/2009 | Tipler |
| 7,908,901 B2 | 3/2011 | Kyle et al. |
| 8,167,987 B2 | 5/2012 | Tipler |
| 2008/0105032 A1 | 5/2008 | Reddy et al. |

FOREIGN PATENT DOCUMENTS

| | | | |
|---|---|---|---|
| JP | 2014002049 A | * | 1/2014 |
| JP | 2014002049 A | | 1/2014 |
| JP | 2014215195 A | | 11/2014 |
| WO | 2004081557 A1 | | 9/2004 |

OTHER PUBLICATIONS

International Search Report and Written Opinion issued in counterpart PCT Application No. PCT/US2016/040103 dated Jan. 17, 2017 (eight (8) pages).
Supplemental European Search Report for EP16907533 dated Jan. 29, 2020 (11 pages).
S.A. Volkov et al: "Gas chromatography with programming the mobile phase flow rate," Chromatographia, vol. 12, No. 5, May 1, 1979 (May 1, 1979), pp. 271-276, XP55659727, DE ISSN:0009-5893, DOI: 10,1007/BF02261828 *the whole document*.

* cited by examiner

METHOD AND SYSTEM FOR REDUCING THE EFFECTS OF COLUMN BLEED CARRYOVER

RELATED APPLICATIONS

This application is the national stage under 35 U.S.C. 371 of International Application No. PCT/US2016/040103, filed Jun. 29, 2016, titled "METHOD AND SYSTEM FOR REDUCING THE EFFECTS OF COLUMN BLEED CARRYOVER", the entire contents of which are incorporated herein by reference.

TECHNICAL FIELD

The present invention relates generally to gas chromatography (GC), and particularly to controlling column temperature and flow during the time in which a GC column is cooled down, such that the effects of column bleed carryover may be reduced.

BACKGROUND

Gas chromatography (GC) entails the analytical separation of a vaporized or gas-phase sample that is injected into a chromatographic column. A chemically inert carrier gas, such as helium, nitrogen, argon, or hydrogen, is utilized as the mobile phase for elution of the analyte sample in the column. The sample and carrier gas are introduced into a GC inlet coupled to the column head. In the GC inlet, the sample is injected into the carrier gas stream and the resulting sample-carrier gas mixture flows through the column. This is referred to as column flow. During column flow the sample encounters a stationary phase (typically a material lining the inside surface of the column), which causes different components of the sample to separate according to different affinities with the stationary phase. The separated components elute from the column exit and are measured by an appropriate detector, producing data from which a chromatogram or spectrum identifying the components may be constructed. While the sample flows through the column, the column (and thus the sample) is maintained at a desired temperature. For this purpose, the column is typically housed in a thermally-controlled oven or positioned in thermal contact with a heating device. Temperature-programming the column allows a wider range of components to be analyzed in a single run. If a temperature program is used, the column is typically cooled down to the method start temperature in between sample runs.

Varying the column temperature affects the stationary phase as well. Typically the stationary phase is stable at the initial column temperature and is unchanged even after long periods under these conditions. However, as the temperature increases the stationary phase can begin to degrade. As it degrades, decomposition products are produced, and these decomposition products are volatile enough that at higher temperatures they are unretained or partially retained by the stationary phase, and for some types of detectors produce a signal. This signal adds to the signal produced by the analytical sample's components, raising the baseline signal level. This is referred to as column bleed, and most of the time it is easily distinguished from the peaks produced by the elution of the components of the analytical sample.

As noted, column bleed is typically unretained at the highest temperatures, and it is typically fully retained at the lowest temperatures, i.e. the decomposition products remain at fixed positions within the column. At intermediate temperatures column bleed is partially retained. When a new sample run starts and the column temperature begins to ramp upward, if some column bleed from previous sample runs is still present within the column, it will begin to elute, resulting in a rising baseline. Eventually this will be joined by newly formed column bleed and the baseline will rise further. Again, the effect of this will often be minor since column bleed typically produces a broad signal that is not confused with peaks.

There is a situation, however, under which column bleed can become a more serious issue. If, as the retained column bleed from previous runs begins to elute, it is not distributed uniformly within the column, then it can produce what appear to be peaks in the chromatogram, and this can interfere with the analysis of the sample. The retained column bleed can become unevenly distributed in the column if the column is cooled very rapidly following the previous run, and especially if the column is not cooled uniformly. Since the carrier gas is still flowing during cooling, column bleed components will tend to migrate from warmer sections of the column to cooler sections. The longer the column spends in this intermediate temperature region and the more uneven the column temperature is during this time, the greater is the separation of the column bleed between parts of the column.

When the column temperature is rising at the beginning of the next run, if the temperature rises slowly enough then the pockets of left over column bleed elute as fairly broad peaks that are easily distinguished from the much sharper peaks of the analytical sample. The more rapidly the temperature rises, the narrower these column bleed peaks become until they begin to cause problems. One could minimize this effect by cooling the column slowly and evenly, or by heating it more gradually at the start of a sample run, but either of these strategies would increase the time between sample runs and reduce the sample throughput.

There continues to be a need for methods and systems for reducing the effects of column bleed, caused by thermally induced decomposition of the stationary phase in a GC column.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for performing gas chromatography (GC) on a sample includes: flowing a carrier gas through a GC column; during a sample run time, heating the GC column according to a heating program, the heating program comprising increasing a column temperature of the GC column from an initial column temperature to a final column temperature; during the sample run time, injecting the sample into the flowing carrier gas to produce a mixture of the sample and the carrier gas, and flowing the mixture through the GC column; and after the sample run time, cooling the GC column according to a cooling program, the cooling program comprising: decreasing the column temperature from the final column temperature to a dwell temperature; holding the column temperature at the dwell temperature for an isothermal dwell time; and after the isothermal dwell time, decreasing the column temperature from the dwell temperature to the initial column temperature. Optionally, the flow of carrier gas through the column can be increased to and held at a dwell flow or dwell pressure during the isothermal dwell time.

According to another embodiment, a gas chromatography (GC) system includes: a GC column; a carrier gas source configured for flowing a mixture of a sample and a carrier gas through the GC column; a heating device configured for heating the GC column; and a controller configured for: controlling the carrier gas source to flow the mixture through the GC column during a sample run time; controlling the heating device to heat the GC column during the sample run time according to a heating program, the heating program comprising increasing a column temperature of the GC column from an initial column temperature to a final column temperature; and controlling the heating device to cool the GC column after the sample run time according to a cooling program, the cooling program comprising: decreasing the column temperature from the final column temperature to a dwell temperature; holding the column temperature at the dwell temperature for an isothermal dwell time; and after the isothermal dwell time, decreasing the column temperature from the dwell temperature to the initial column temperature. Optionally, the flow of carrier gas through the column can be increased to and held at a dwell flow or dwell pressure during the isothermal dwell time.

According to another embodiment, a method for performing gas chromatography (GC) on a sample includes: flowing a carrier gas through a GC column; during a sample run time, heating the GC column to a predetermined temperature or according to a predetermined temperature profile; during the sample run time, injecting the sample into the flowing carrier gas to produce a mixture of the sample and the carrier gas, and flowing the mixture through the GC column; after the sample run time, cooling the GC column during a cooling time; and prior to and/or during at least an initial portion of the cooling time, reducing or ceasing the flowing of the carrier gas through the GC column.

According to another embodiment, a gas chromatography (GC) system includes: a GC column; a carrier gas source configured for flowing a mixture of a sample and a carrier gas through the GC column; a heating device configured for heating the GC column; and a controller configured for: controlling a carrier gas source to flow the mixture through the GC column and to the detector; controlling the heating device to heat the GC column to a predetermined temperature or according to a predetermined temperature profile during a sample run time; after the sample run time, controlling the cooling of the GC column during a cooling time; and controlling the carrier gas source, or a flow regulator between the carrier gas source and the GC column, to reduce or cease flowing the carrier gas through the GC column prior to and/or during at least an initial portion of the cooling time.

According to another embodiment, a method for performing gas chromatography (GC) on a sample includes: flowing a carrier gas through a GC column; heating the GC column to a predetermined temperature or according to a predetermined temperature profile during a sample run time; injecting the sample into the flowing carrier gas to produce a mixture of the sample and the carrier gas; flowing the mixture through the GC column; after the analysis is complete, cooling the GC column during a cooling time; and during at least a portion of the cooling time, slowing down the flow of carrier gas through the GC column to a rate that is less than the flow rate of carrier gas through the column during the analysis.

According to another embodiment, a gas chromatography (GC) system or apparatus includes: a GC column comprising a column inlet and a column outlet; a carrier gas source configured for flowing a mixture of a sample and a carrier gas into the column inlet; a detector configured for detecting analytes of the mixture flowing from the column outlet; a heating device configured for heating the GC column; and a controller configured for: controlling a carrier gas source to flow the carrier gas and the sample through the GC column and to the detector; controlling the heating device to heat the GC column to a predetermined temperature or according to a predetermined temperature profile during a sample run time; controlling the cooling of the GC column; and controlling the carrier gas source to slow down the flow of carrier gas through the GC column during at least a period of the cooling time to a rate that is less than the flow rate of carrier gas through the column during the sample run time.

According to another embodiment, a gas chromatography (GC) system or apparatus is configured for performing or controlling any of the methods disclosed herein.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In the context of the present disclosure, the term "analyte" refers generally to any sample molecule of interest to a researcher or user of a gas chromatograph (GC)—that is, a molecule on which an analysis is desired such as, for example, a chromatographic or chromatographic/mass spectral analysis. The term "sample" or "sample matrix" refers to any substance known or suspected of containing analytes. The sample may include a combination of analytes and non-analytes. The term "non-analytes" or "non-analytical components" in this context refers to components of the sample for which analysis is not of interest because such components do not have analytical value and/or impair (e.g., interfere with) the analysis of the desired analytes. Non-analytes may generally be any molecules not of interest such as contaminants or impurities. Examples of non-analytes may include, but are not limited to, water, oils, solvents or other media in which the desired analytes may be found, as well as stationary phase material that has bled from a chromatographic column.

As used herein, for convenience the term "gas" encompasses vapors, and gases in which vapors, droplets or particles may be entrained.

Figure 1:
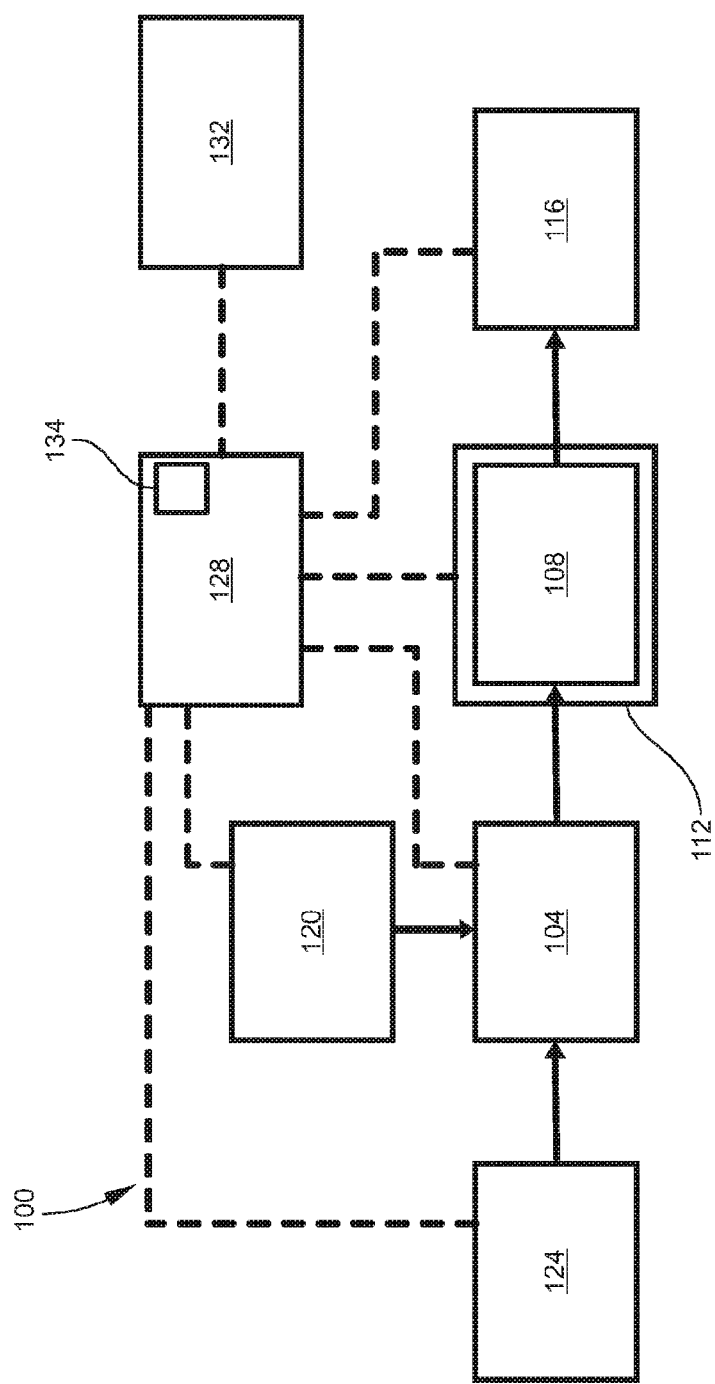
FIG. 1 is a schematic view of an example of a gas chromatograph (GC) system or apparatus according to a representative embodiment.

FIG. 1 is a schematic view of an example of a gas chromatograph (GC) system or apparatus 100, also referred to simply as a gas chromatograph or GC, according to a representative embodiment. Gas chromatography and instrumentation utilized in the implementation of gas chromatography are generally understood by persons skilled in the art. Accordingly, the GC 100 and certain components thereof are described only briefly herein as needed for facilitating an understanding of the subject matter disclosed herein.

The GC 100 may generally include a GC inlet (or GC inlet device) 104, a GC column 108, a heating device (or column heater) 112, and a detector 116. The GC 100 may also include a sample introduction device (or sample injector) 120 and a carrier gas source (or carrier gas supply device) 124. The GC 100 may further include a system controller or computing device (or more simply a controller) 128. Also shown schematically is a power source 132, which may represent one or more devices configured to provide electrical power to one or more power-consuming components of the GC 100 such as the controller 128, the heating device 112, etc.

The sample introduction device 120 may be any device configured for injecting a sample into the GC inlet 104. Sample injection may be carried out on an automated, semi-automated or manual basis. The sample introduction device 120 may, for example, include a manually operated syringe or a syringe that is part of an automated sampling apparatus (or "autosampler"). The source of the sample may be the syringe itself, or may be one or more sample containers provided at the sample introduction device 120. In the latter case, the sample containers may be loaded on a carousel or other device that selects a desired sample for injection into the GC column 108. The sample may also be introduced as a gas.

The carrier gas source 124 supplies a flow of carrier gas to the GC inlet 104 via a carrier gas line at a regulated flow rate and/or pressure. The carrier gas source 124 may include, for example, a tank and flow controls or pressure controls (e.g., valve(s), flow regulator(s), etc.). The carrier gas may be any gas suitable for serving as an inert mobile phase that facilitates transport of the sample through the GC column 108 as appreciated by persons skilled in the art. Examples of carrier gases include, but are not limited to, helium, nitrogen, argon, and hydrogen. The carrier gas source 124 can also supply gas that does not flow through the column 108, such as split vent flow in a split/splitless inlet, septum purge flow, etc., as appreciated by persons skilled in the art.

The GC inlet 104 is configured to introduce the sample to be analyzed into the carrier gas flow, and may also be configured to perform certain types of pre-column processing on the sample/carrier gas mixture as appreciated by persons skilled in the art. The GC inlet 104 may include respective ports communicating with the sample introduction device 120, the carrier gas source 124, and the head of the column 108. The port communicating with the sample introduction device 120 may include a septum that may be penetrated by a needle utilized to inject the sample and may be self-re-sealable after removal of the needle. The GC inlet 104 may also include one or more internal chambers communicating with such ports, as well as one or more vents. The GC inlet 104 may also include a local temperature control device.

The heating device 112 may have any configuration suitable for maintaining the column 108 at a desired temperature setting or for varying the temperature of the column 108 according to a desired (predetermined) temperature profile (i.e., temperature programming), such as for balancing parameters such as elution time and measurement resolution. In some embodiments, the heating device 112 is configured for heating the column 108 indirectly by heating an interior space in which the column 108 is enclosed. For example, the column 108 may be mounted in a "GC oven." In other embodiments, the heating device 112 is configured for heating the column 108 directly. For example, the column 108 may be mounted directly or in close proximity to the heating device 112, or the heating device 112 may include a resistive heating element wrapped around the column 108. In all such embodiments, the heating device 112 may be considered as being positioned in thermal contact with the column 108, i.e., positioned so as to be effective in controlling the temperature of the column 108 with a responsiveness sufficient for GC sample runs.

The GC 100 may also include devices for actively cooling the column, such as fans or other sources of moving fluids sufficient for lowering the column temperature, thermoelectric (e.g., Peltier) coolers, cryogenic fluids, and other methods of cooling known to persons skilled in the art.

The detector 116 may be any detector suitable for detecting the separated bands (or "peaks") eluting from the column 108. Examples of detectors include, but are not limited to, flame ionization detectors (FID), thermal conductivity detectors (TCD), electron capture detectors (ECD), flame thermionic detectors (FTD), flame photometric detectors (FPD), etc. Generally, a wide variety of detectors may be utilized, and the illustrated detector 116 may represent a combination of two or more different types of detectors. In some embodiments, the detector 116 is, or is part of, an analytical instrument such as, for example, a mass spectrometer (MS), an ion mobility spectrometer (IMS), etc. Thus in some embodiments the GC system 100 may be a hyphenated system such as a GC-MS or GC-IMS system. The detector 116 may also be schematically representative of a data acquisition system, display/readout device, and other components associated with generating chromatograms and spectra as appreciated by persons skilled in the art.

The controller 128 may represent one or more modules configured for controlling, monitoring and/or timing various functional aspects of the GC system 100 such as, for example, controlling the operations of the sample introduction device 120, the carrier gas source 124, the GC inlet 104, the heating device 112, and the detector 116, as well as controlling various gas flow rates, temperature and pressure conditions. In particular, the controller 128 is configured for controlling the heating and cooling of the column 108 by controlling the heating device 112 (and optionally also an active cooling device, as noted previously) and the flow of carrier gas (by controlling the carrier gas source 124), as described further herein. Thus, the controller 128 may include a programmable column temperature controller 134. The controller 128 may also be configured for receiving the detection signals from the detector 116 and performing other tasks relating to data acquisition and signal analysis as necessary to generate data (e.g., a chromatogram) characterizing the sample under analysis. The controller 128 may include a non-transitory computer-readable medium that includes instructions for performing any of the methods disclosed herein. The controller 128 may include one or more types of hardware, firmware and/or software, as well as one or more memories and databases, as needed for performing the controlling, monitoring and/or timing operations. The controller 128 typically includes a main electronic processor providing overall control, and may include one or more electronic processors configured for dedicated control operations or specific signal processing tasks. The controller 128 may also include one or more types of user interface devices, such as user input devices (e.g., keypad, touch screen, mouse, and the like), user output devices (e.g., display screen, printer, visual indicators or alerts, audible indicators or alerts, and the like), a graphical user interface (GUI) controlled by software, and devices for loading media readable by the electronic processor (e.g., logic instructions embodied in software, data, and the like). The controller 128 may include an operating system (e.g., Microsoft Windows® software) for controlling and managing various functions of the system controller. For all such purposes and functions, FIG. 1 schematically depicts communication links (dashed lines) between the controller 128 and various other components shown in FIG. 1, which may be wired or wireless links. It will be understood that the controller 128 may communicate with other components not specifically shown in FIG. 1 such as, for example, various sensors (e.g., for measuring/monitoring temperature, pressure, flow rate, etc.). Solid lines in FIG. 1 generally depict fluid flow and various conduits defining or directing such fluid flow.

Figure 2:
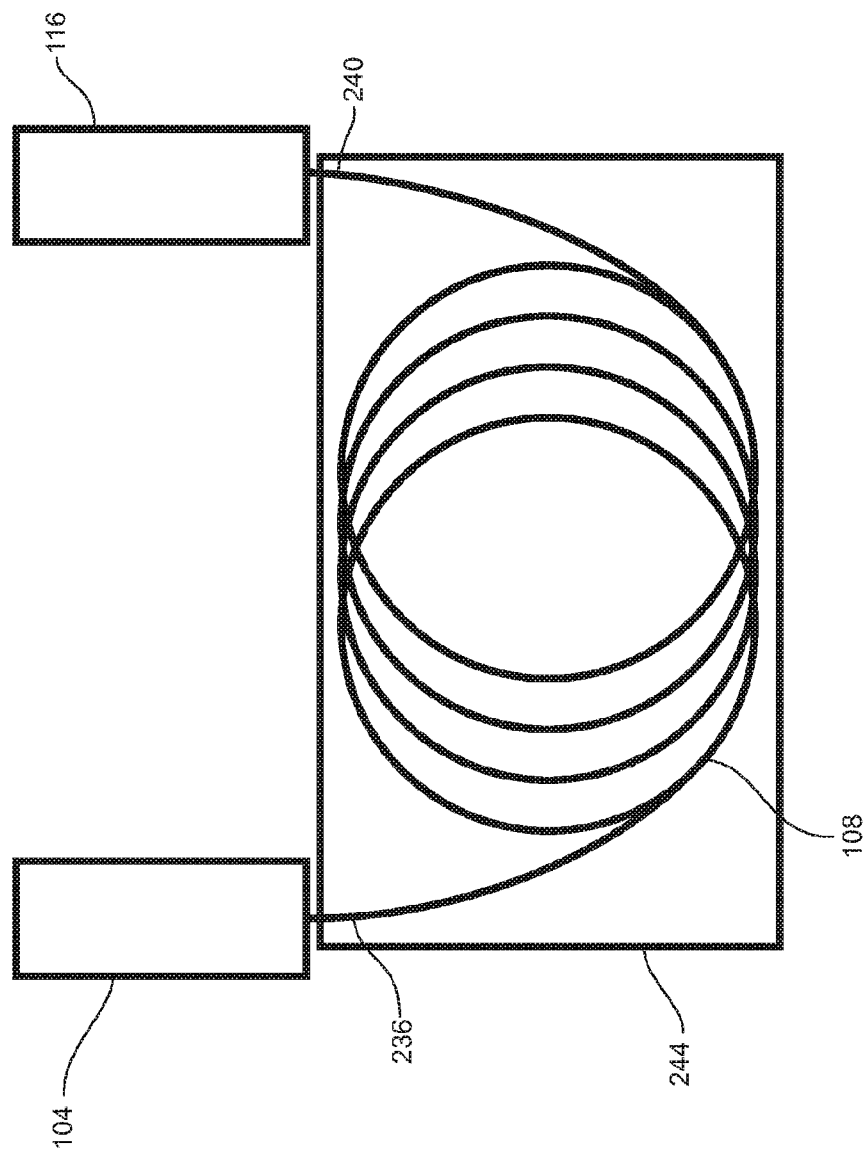
FIG. 2 is a schematic view of a GC column and associated components according to an embodiment.

FIG. 2 is a schematic view of the GC column 108 and associated components that are part of or define the path of sample flow through the GC 100. The column 108 at one end has a column inlet 236 fluidly communicating with the GC inlet 104 (directly or indirectly), and at the other end has a column outlet 240 fluidly communicating with the detector 116 (directly or indirectly). Generally, the column 108 may have any configuration now known or later developed. The column 108 is typically a small-bore tube (e.g., with an inside diameter on the order of tens or hundreds of micrometers ($\mu$m)) composed of a glass or metal. Typical column lengths range from 5 m to 100 m while typical column inner diameters range from 50 $\mu$m to 530 $\mu$m. The column 108 may have an outer coating of polyimide or another material to strengthen and protect the column 108. The column 108 includes a stationary phase appropriate for GC that lines or coats the inside surface of the column 108. The stationary phase may be, for example, a layer of liquid or polymer having a formulation effective for chromatographic separation and supported on an inert substrate, as appreciated by persons skilled in the art.

As also shown in FIG. 2, the column 108 and all or part of the GC inlet 104 may be enclosed in a housing 244. The housing 244 may include one or more doors enabling access to the column 108 and other components and features located in the interior of the housing 244. When closed, the housing 244 may be configured to be fluid-tight to prevent leakage of gases from the housing interior into the ambient, and may provide thermal isolation between the housing interior and the ambient. In some embodiments, the housing 244 is or includes a temperature-programmable GC oven, and the heating device 112 is configured for heating the interior of the oven through which the column 108 extends. In other embodiments, the heating device 112 may directly heat the column 108 as described above. In some embodiments the housing 244, or that portion of the housing 244 enclosing the interior space in which the column 108 resides, may include one or more vents (which may be selectively opened and closed) that assist in controlling the heating and cooling of the column 108. As also shown in FIG. 2, the column 108 may be coiled into a single-loop or multi-loop configuration to accommodate a desired length between the column inlet 236 and the column outlet 240 while minimizing the size of the housing 244. The column 108 may be coiled in a plane, in a cylindrical shape, etc. The column 108 may be configured in any additional manner such that not all portions of the column 108 cool at the same time or the same rate. Additionally, it will be understood that the column 108 shown in FIG. 2 may schematically represent two or more distinct columns, arranged in series and/or in parallel via appropriate fluidic couplings (unions, tee connections, etc.), and that the GC system 100 (FIG. 1) may in some embodiments be configured for multi-dimensional GC sample runs.

It will be understood that FIGS. 1 and 2 are a high-level schematic depictions of a representative GC system 100 and associated components. As appreciated by persons skilled in the art, other components and features such as additional structures, devices, and electronics may be included as needed for practical implementations, depending on how the GC system 100 is configured for a given application.

Referring to FIGS. 1 and 2, a general example of operating the GC system 100 to analyze a sample is as follows. The carrier gas source 124 is operated to establish a flow of carrier gas under desired (predetermined) flow conditions (pressure, flow rate, etc.) through the GC inlet 104, the column 108, and the detector 116, referred to as column flow. The carrier gas source 124 may also provide flow to other parts of the GC system 100. The period of time starting with sample injection, followed by flow of the sample through the column 108 and arrival of the separated bands at the detector 116 (i.e. the elution of the analytes of interest from the column), is referred to herein as the sample run time. In some cases the column flow may be held constant or ramped throughout the sample run time. In other cases, a constant or ramped pressure can be held at the head of the column 108 throughout the sample run time. The heating device 112 is operated to heat the column 108 to a predetermined initial column temperature. The sample introduction device 120 is operated to inject a sample into the carrier gas stream flowing through the GC inlet 104 to produce a mixture of the sample and the carrier gas. The internal gas pressure at the head of the column 108 drives the sample/ carrier gas mixture through the column 108, during which time the different analytes of the sample interact with the stationary phase in the column 108 with different degrees of affinity. This results in the different analytes becoming separated from each other along the length of the column 108, which ultimately results in the different analytes eluting from the column outlet 240, and thus reaching the detector 116, at different times (i.e., in sequence—e.g., first analyte A, then analyte B, then analyte C, etc.), with analyte molecules of the same type (i.e., the same chemical compound) eluting together as a "band" or "peak." The detector 116 detects the different analytes as they arrive at the detector 116, operating on a detection/measurement principle that depends on the type of detector being employed (FID, MS, etc.). The detector 116 outputs electrical signals (analyte detection/measurement signals) to the controller 128, which processes and conditions the signals as needed to produce a chromatogram, as appreciated by persons skilled in the art.

During the sample run time, the heating device 112 is operated to maintain the column temperature at a predetermined or set point value, or to vary the column temperature according to a predetermined temperature profile or program, as prescribed by the particular method being implemented. After the sample run time (i.e. after the analytes of interest have been separated and eluted from the column for that particular sample run), the column 108 is cooled down in preparation for the next sample run. The cooling down of the column 108 may be effected by an abrupt ceasing of active operation of the heating device 112 or by controlling the heating device 112 so as to gradually ramp down the actively applied heat. The cooling down of the column 108 may also be actively assisted by operating a cooling device such as a fan (i.e., forced-air cooling), a thermoelectric (e.g., Peltier) device, or a cryogenic fluid such as liquid nitrogen or carbon dioxide, or other methods known in the art. The time during which the column 108 is cooled down is referred to herein as the column cooling time.

During a sample run the column 108 may reach a column temperature high enough to cause the stationary phase to begin to decompose, resulting in a phenomenon known as "column bleed." Certain GC detectors (e.g., GCMS, FID) may be sensitive to these decomposition products. Due to their smooth and continuous elution during a sample run, the decomposition of the column stationary phase will result in an increase in the baseline signal of the sample run which will decrease the signal-to-noise ratio of the detector. At the end of the sample run, however, some of these decomposition products will still be present in the column 108 and, depending on how quickly and uniformly the column 108 is cooled and how rapidly the temperature is ramped in the next sample run, these products from a previous run may disturb the baseline for the next sample run in a more dramatic way.

If the column 108 is cooled gradually and evenly after a sample run, then the effects of column bleed from the previous sample run on the baseline for the next sample run will be small. Slow and even cooling allows the decomposition products to evenly distribute along the length of the column 108. When the decomposition products become mobile again during the next sample run, they will elute in a smooth and continuous manner which will result in a smooth increase in the baseline. However, if the column 108 is cooled very quickly (e.g., at a rate of greater than 200° C./min), and particularly asymmetrically, then significant temperature gradients can form within the coils (or loops) of the column 108. These temperature gradients are only sustained for a short period of time, but during this time the decomposition products, aided in mobility by the flow of the carrier gas, can migrate and redeposit preferentially into the cooler areas of the column 108. When the temperature is ramped up during the next sample run, these decomposition products may elute along with the sample analytes. Due to their sporadic or discontinuous positions in the column 108, instead of causing a smooth increase in baseline level, the decomposition products cause a disturbance in the baseline that appears irregular. In particular, the disturbances or oscillations in the baseline may be pronounced enough to be observable as peaks (i.e., a type of "ghost" peak), which can cause errors in peak identification or integration.

As noted above, cooling the column 108 more slowly than the normal method would reduce the formation of thermal gradients in the column 108 that can cause this carryover effect. Such a solution, however, can significantly increase the cooling time and thereby decrease sample analysis throughput. Another solution might be to bake-out the column 108 to reduce the generation of column bleed, but the bake-out process may require several hours and again increase sample analysis throughput by an undesirable amount. Also, prolonged exposure to high temperatures may reduce the effectiveness of the stationary phase.

In view of the foregoing considerations, according to an embodiment a three-stage column cooling program is implemented to mitigate column bleed carryover. The three-stage column cooling program comprises a first high-speed cooling ramp followed by an isothermal hold—i.e., a dwell or hold time during which the column temperature is held at an isothermal dwell or intermediate temperature—which in turn is followed by a second high-speed cooling ramp. The dwell temperature is one that is cool enough that the column phase does not decompose appreciably but is still warm enough to facilitate the flushing away of any decomposition products. In one non-limiting example, the dwell temperature is in a range from about 20° C. to about 100° C. below the final column temperature. The flushing time, which is the sum of the time of the first high-speed cooling ramp and the isothermal dwell time, is a predetermined period of time effective to allow decomposition products to be flushed from the column 108. In one non-limiting example, the flushing time is in a range from about 1 to about 4 times the void time of the column 108. As used herein, the column void (or dead) time is the amount of time an analyte would spend in the mobile phase (carrier gas) from the time of injection into the mobile phase to the time of arrival at the detector 116, without being retained by the stationary phase in the column 108. In one non-limiting example, the flushing time spans a period in a range of about 1 minute to 5 minutes.

Optionally during the isothermal hold (dwell time), the column inlet pressure may be increased to speed flushing of the decomposition products by increasing the column flow. Increasing the column flow during the isothermal hold may be useful for reducing the effective column void time and consequently reducing the required flushing time.

After the predetermined isothermal hold time, high-speed cooling is reinitiated (i.e., the second cooling ramp is initiated) to return to a starting column temperature in preparation for the next sample run. Also before the end of or after the predetermined isothermal hold time, the column flow rate (if increased during the isothermal hold as just described) is reduced back down to an initial flow rate (such as by dropping the column inlet pressure) in preparation for the next sample run.

The first and second cooling ramps are described as being "high-speed" in that their associated cooling rates are relatively rapid. As one non-limiting example, the cooling rate implemented during either or both of the first and second cooling ramps is in a range from 100° C./min to 1000° C./min. In some embodiments, the cooling rate of the first cooling ramp is greater (faster) than the cooling rate of the second cooling ramp. In some embodiments, the duration of the first cooling ramp is less (shorter) than the duration of the second cooling ramp.

Figure 3:
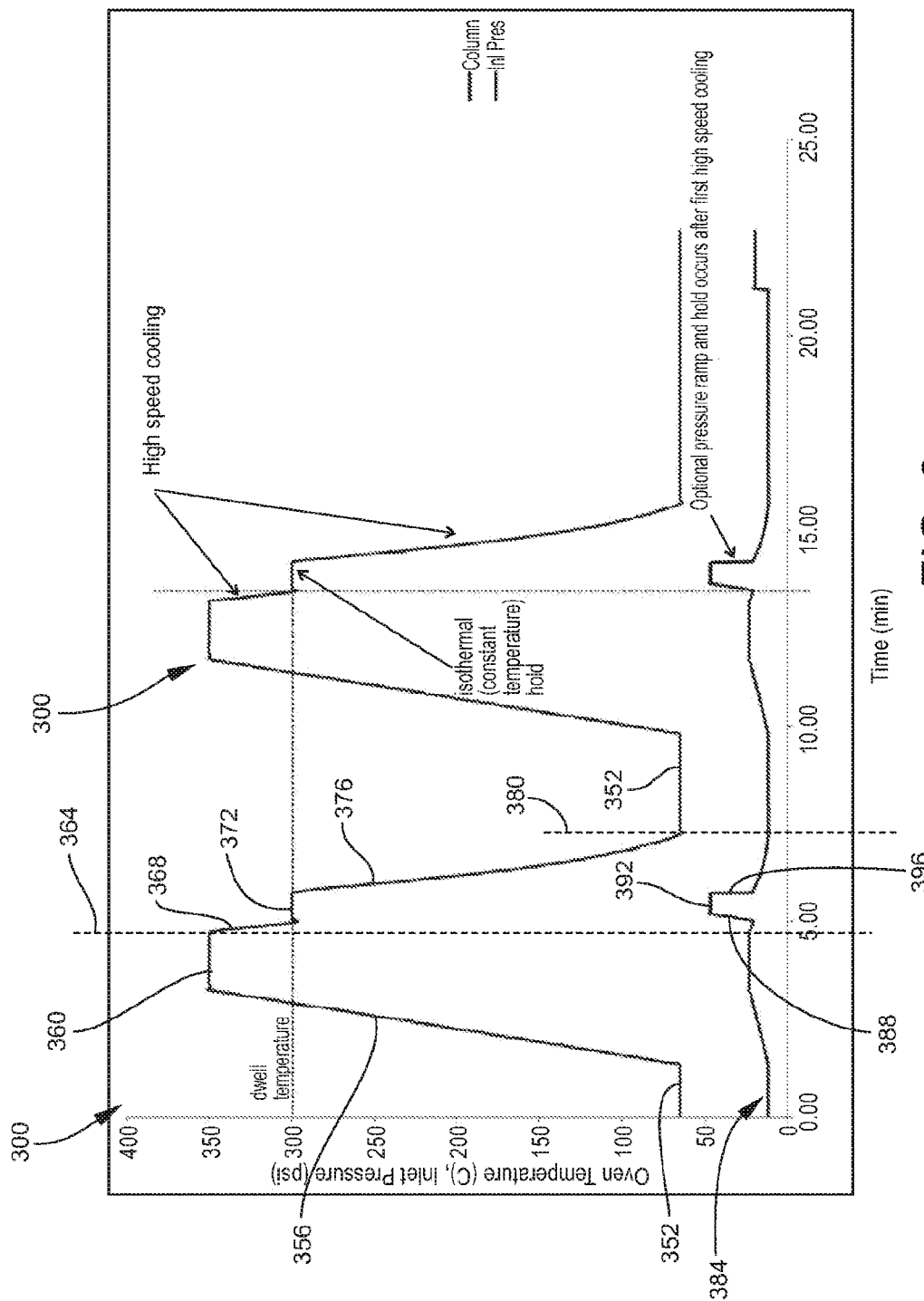
FIG. 3 illustrates an example of a column temperature program (or profile) implemented in a GC system according to an embodiment.

FIG. 3 illustrates an example of a column temperature program (or profile) 300 that may be repeated during successive operating cycles (sample run time plus column cooling time) of a GC system, two such cycles being shown in FIG. 3. Specifically, the column temperature program 300 is a plot of column temperature (° C.) over time (min). As described above, one operating cycle generally includes a sample run time followed by a column cooling time. During the sample run time, a sample is introduced into the carrier gas flow and driven thereby through the GC column, the resulting separated fractions elute from the column and into the detector, and chromatographic data is acquired thereby. The column cooling time corresponds to the period of time during which the column is cooled down according to embodiments disclosed herein and occurs after the analytes of interest have eluted from the column for a particular sample run.

The column temperature program 300 begins with the column being heated to an initial column temperature 352 that is a relatively low temperature (e.g., between 30° C. and 100° C.). The column may be held at the initial column temperature 352 (which may be generally constant or slightly varied) for a relatively short period of time (e.g., a few minutes). The initial column temperature 352 may be followed by one or more heating ramps 356 and isothermal holds. The final column temperature 360 is typically but not always the maximum temperature in the run. In the illustrated example the final column temperature 360 is 350° C., while in other examples may be more or less than 350° C. The column may be held at the final column temperature 360 for a relatively short period of time (e.g., a few minutes). The end point of the period at final column temperature 360 may correspond to the start point of the cooling time, which may be referred to as a heating-cooling transition point 364. The end of the sample run time may correspond to the heating-cooling transition point 364, or the end of the sample run time may occur at some earlier point during the period at final column temperature 360. The start of the sample run time may occur before, at, or after the point of transition from the initial column temperature 352 to the heating ramp 356.

FIG. 3 illustrates a relatively simple case in which the heating portion (the heating profile or heating program) of the column temperature program 300 includes a period of initial column temperature 352, followed by one heating ramp 356, followed by a period at final column temperature 360. More generally, it will be understood that the features of the heating portion of the column temperature program 300 will depend on the parameters called for by the particular chromatography method being implemented on a given sample. Thus, for example, the heating portion of the column temperature program 300 may include two or more distinct heating ramps, which may have the same or different heating rates, and which may or may not be separated by one or more periods of constant-temperature hold times occurring at one or more intermediate temperatures between the initial column temperature 352 and the final column temperature 360.

The column cooling time starts at the heating-cooling transition point 364 and ends at a transition point at which the initial column temperature 352 is again reached. As noted above, in the present embodiment the cooling portion of the column temperature program 300 is a three-stage column cooling program that includes a first cooling ramp 368 followed by an isothermal hold 372, which is then followed by a second cooling ramp 376. In the illustrated example the temperature of the isothermal hold 372, i.e. the dwell temperature, is 300° C., while in other examples may be more or less than 300° C. The dwell temperature and the dwell time (the duration of the isothermal hold 372) may be determined in a variety of ways, examples of which are described below.

The period of time during which the column is held at initial column temperature 352 may be set as needed to provide time for column conditions to stabilize between the preceding cooling time following one sample run and the subsequent heating ramp 356 of the next sample run.

Depending on the particular chromatography method being implemented on a given sample, the column flow may be maintained constant (or substantially constant) or may be varied one or more times during the sample run. As noted above, in some embodiments the column flow is increased during all or part of the period of the isothermal hold 372. Typically but not exclusively, the column flow is dictated or controlled by the fluid pressure at the inlet or head of the column. FIG. 3 illustrates an example of a pressure program (or profile) 384 that may be repeated during successive operating cycles (sample runs plus column cooling time) of the GC system. Specifically, the pressure program 384 is a plot of column inlet pressure (psi) over time (min). In the illustrated embodiment, the pressure program 384 includes an optional increasing pressure ramp 388 during the isothermal hold that increases the column inlet pressure from an initial pressure up to an elevated pressure. The increasing pressure ramp 388 is followed by a dwell pressure hold 392 during which the pressure is maintained at the elevated value. The dwell pressure hold 392 is followed by a decreasing pressure ramp 396 that decreases the column inlet pressure back down to (or back down to about) the initial pressure. The decreasing pressure ramp 396 may be relatively abrupt, i.e., as a step-down. The increasing pressure ramp 388 may start at or just after the start of the isothermal hold 372. The dwell pressure hold 392 may span all or part of the period of the isothermal hold 372. The elevated pressure and the duration of the dwell pressure hold 392 may be determined in a variety of ways, examples of which are described below.

The initial pressure is the value of the column inlet pressure at the start of the increasing pressure ramp 388, and may or may not be the same as the column inlet pressure at the start of the sample run. As illustrated by example in FIG. 3, the pressure program 384 may vary the column inlet pressure at other times during the sample run, i.e., may include other pressure ramps, steps, or holds in addition to those associated with the dwell pressure hold 392.

Figure 4:
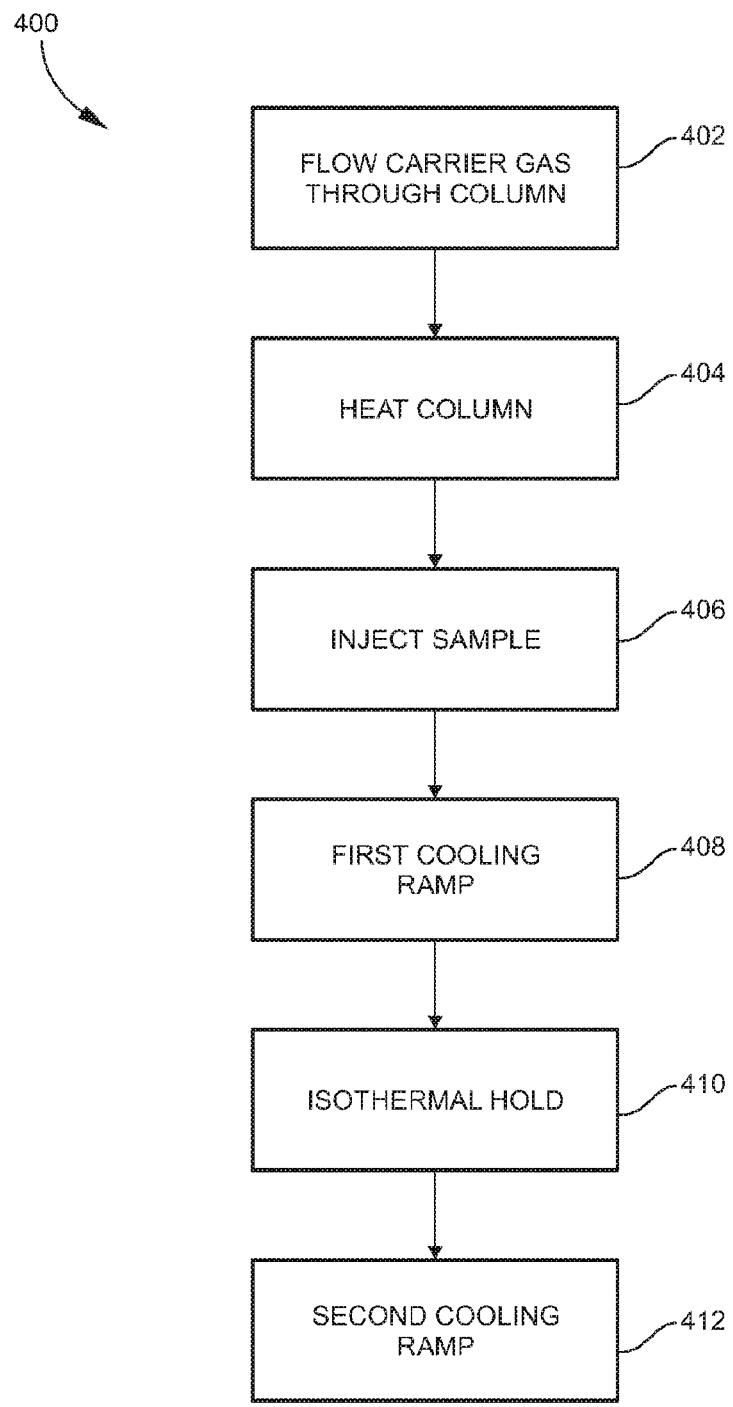
FIG. 4 is a flow diagram illustrating an example of a method for performing gas chromatography (GC) on a sample according to an embodiment.

FIG. 4 is a flow diagram 400 illustrating an example of a method for performing gas chromatography (GC) on a sample according to an embodiment of the present disclosure. As initial steps, a flow of carrier gas through a GC column is initiated (step 402), and heating of the GC column is initiated (step 404). Heating of the GC column, for example to some low temperature, may be initiated prior to the start of the flow of carrier gas through a GC column. Thus, the order in which steps 402 and 404 are shown in FIG. 4 is not intended to limit the order in which the carrier gas flow and the column heating are initiated. After the start of carrier gas flow and the column heating, the sample is then injected (step 406) into the flowing carrier gas to produce a mixture of the sample and the carrier gas, and the mixture is flowed through the GC column to a detector to acquire chromatographic data from the sample, during a period of time referred to herein as a sample run time. While the mixture is flowed through the GC column, the heating step 404 may entail increasing a column temperature of the GC column from an initial temperature to a maximum temperature. After the sample run time, the GC column is cooled according to a cooling program. The cooling program may include a first cooling ramp (step 408) by which the column temperature is decreased from the maximum temperature to a dwell temperature, a subsequent period of an isothermal hold or dwell (step 410) during which the column temperature is held at a substantially constant dwell temperature, and a subsequent second cooling ramp (step 412) by which the column temperature is decreased from the dwell temperature back to the initial temperature. Optionally, the fluid flow rate through the GC column may be increased during the isothermal hold 410 as described above.

The flow diagram 400 illustrated in FIG. 4 may also represent an apparatus or system (e.g., a GC system) capable of performing the illustrated method. A controller of the apparatus or system, such as the controller 128 described herein and illustrated in FIG. 1, may be configured to perform (i.e., control other components of the apparatus or system to perform) all or part of one or more steps of the method. For example, the controller may be configured for controlling a carrier gas source to flow the carrier gas at a predetermined flow rate, controlling a sample injector to inject a predetermined amount of sample material into the carrier gas flow at a predetermined time, controlling a heating device to heat the GC column according to a predetermined heating program, and controlling the heating device (or both the heating device and an active cooling device) to lower the temperature of the GC column according to a predetermined cooling program.

EXAMPLE 1

An Agilent Technologies, Inc. model no. 19091J-413 column (HP-5 320 µm ID×30 m×0.25 µm phase film thickness) was installed in a GC system consistent with that described above and illustrated in FIGS. 1 and 2, which was equipped with an FID. Carrier gas (helium) was run through the column at a constant flow rate of 1 mL/min with no sample material, i.e., the experimental runs evaluated in this Example were "blank" runs. The temperature program 300 included an initial temperature 352 of 65° C., a heating ramp 356 of 150 ° C./min, and a final temperature 360 of 350° C. While the ramp rate 356 of 150 ° C./min exceeds what is typically used for a column of these dimensions, it was useful to help exaggerate the problem so that it is more easily measured.

Figure 5:
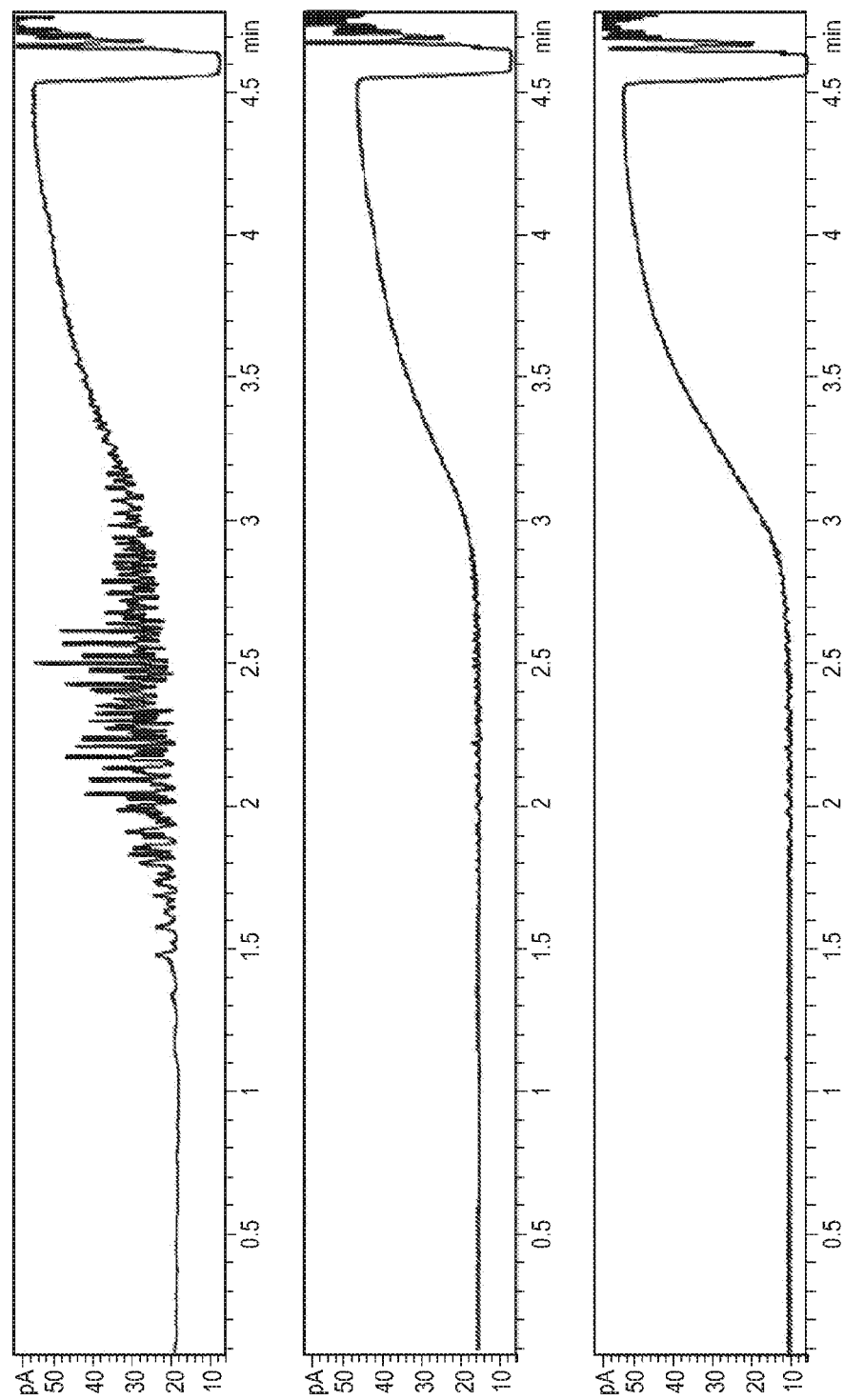
FIG. 5 is a set of three chromatograms acquired from performing three sample runs in series utilizing a GC system as described herein.

FIG. 5 is a set of three chromatograms acquired from performing three sample runs in series utilizing the GC system. In each case the chromatogram shown is the chromatogram of the subsequent run showing noise generated on the baseline due to carryover of column bleed from the previous run. In the top chromatogram, the extent of the column bleed carryover is demonstrated if the techniques describe here are not used. The baseline includes noticeable peaks particularly in the region of 1.5 mins to 3.5 mins. If sample analytes had been injected and had eluted within this time frame, identification and quantification might have been compromised.

If, after a first sample run the column is allowed to flush at a dwell temperature of 300° C., the noise is significantly reduced for the next run given a total flushing time of 2 minutes (first high-speed cooling time plus isothermal dwell time), as evident from comparing the top chromatogram to the middle chromatogram in FIG. 5. For a column of this dimension at 300° C. and 1 ml/min of He flow, the void time is about 1.8 minutes. Flushing for 2 minutes is about 1.1 void times. If, in addition to dwelling at 300° C., the pressure in the column is raised only during the isothermal dwell time to achieve 3 ml/min of dwell flow (0.85 min void time), a comparable level of noise abatement can be achieved with only 1 minute of flushing time, as evident from the bottom chromatogram in FIG. 5.

EXAMPLE 2

Determination of Dwell Temperature

The optimal dwell temperature is largely a function of the type and dimensions of phase on the column and the final temperature of the column. It can be determined experimentally by observing the degree of column bleed causing baseline disturbances in the subsequent run (in the following examples, American Society for Testing and Materials (ASTM) Noise is the measure used) resulting from flushing for 1 to 2 void times using various dwell temperatures after the previous run ends and between rapid cool-downs.

Figure 6:
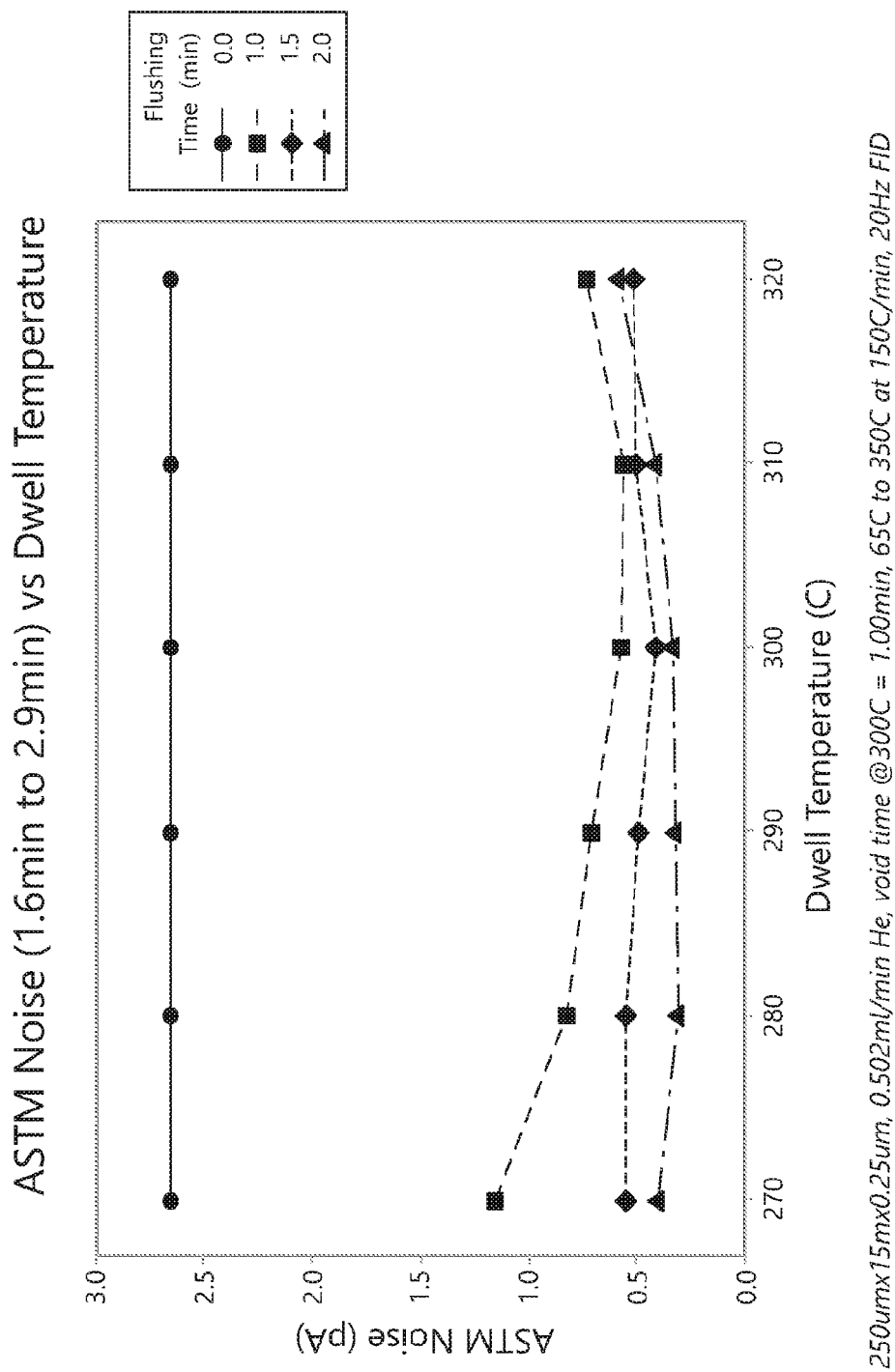
FIG. 6 is a set of plots of ASTM Noise as a function of dwell temperature for four different dwell times, produced from experiments as described herein.

If the dwell temperature chosen is too cool, the bleed products that have been created during the course of the sample run will not be very mobile and will not be easily flushed. If on the other hand the dwell temperature chosen is too hot, the phase on the column will continue to breakdown considerably during the flushing period, which will also result in poor clearing of the column. At an optimal point, these two needs are well balanced. This is shown in FIG. 6, which is a set of plots of ASTM Noise as a function of dwell temperature for four different flushing times for a DB-5ms column and a method including a 350° C. final temperature. For this column and this method condition, a dwell temperature about 50° C. below the final temperature (i.e., 300° C.) is near optimal.

EXAMPLE 3

Determination of Dwell Time

The dwell time is the time spent isothermal at the dwell temperature. In order to generalize across multiple method configurations, it is useful to discuss the total flushing time (sum of the first cooling time and the dwell time) in terms of number of column void times, $N_{void}$, rather than absolute time. This is because the speed that the bleed particles are able to be flushed out of the system is directly related to the flow through the column. The number of column void times during flushing may be expressed as:

$$N_{void} = \frac{\text{first cooling time} + \text{dwell time}}{\text{void time}_{dwell\,temp}}$$

Figure 7:
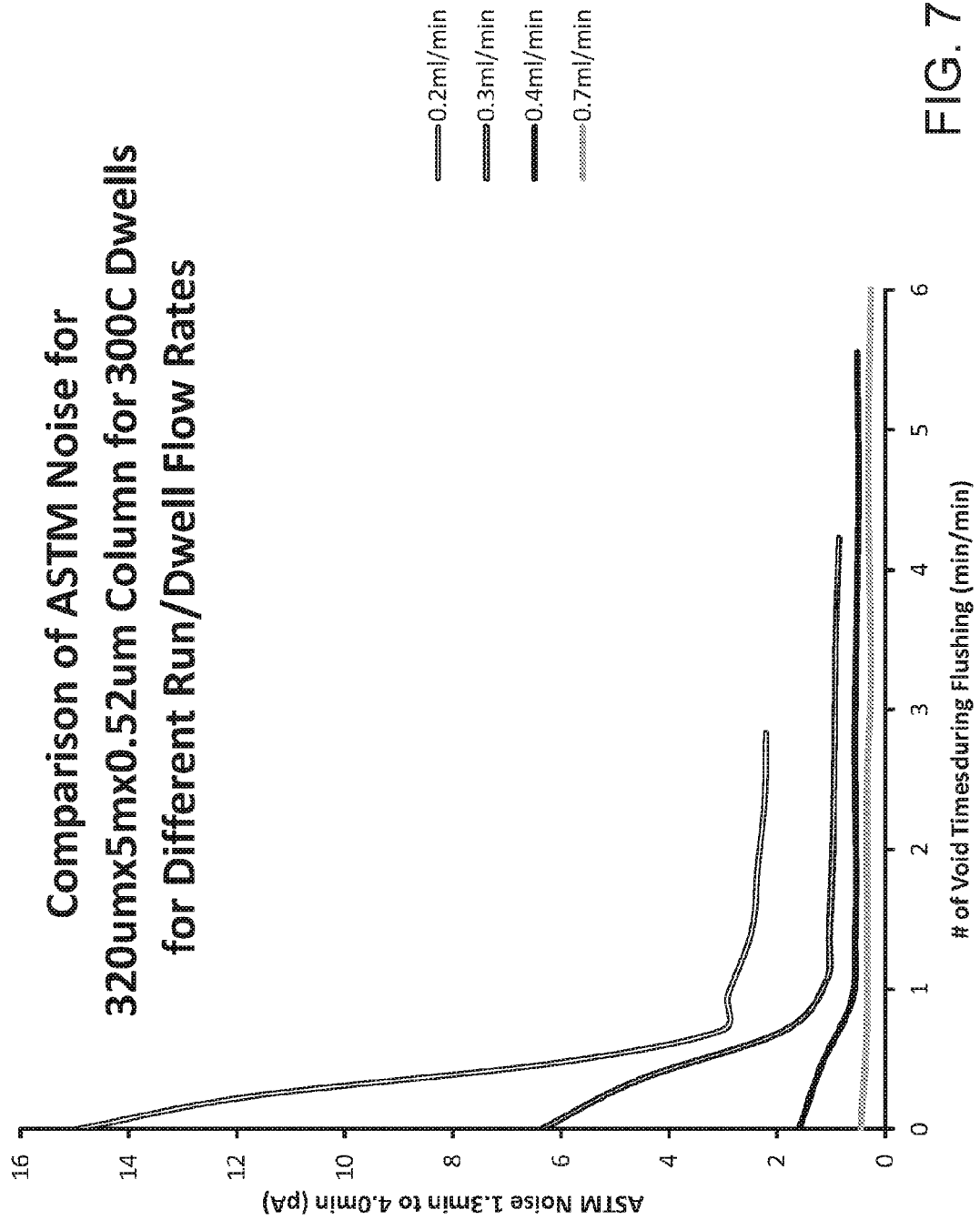
FIG. 7 is a set of plots of ASTM Noise as a function of number of column void times for a column running the same oven thermal profile before and after an experimental run but with four different flow rates.

FIG. 7 is a set of plots of ASTM Noise as a function of number of column void times for an HP-1 column running the same oven thermal profile before and after an experimental run but with four different flow rates. When the curves are scaled in terms of number of void times, they show the similar trend that much of the benefit in reducing the noise is achieved after one void time. This is because the dwell temperature is chosen such that the bleed products are sufficiently mobile. From this, according to an embodiment it is suggested that the dwell time be chosen such that the total flushing time is in the range of about 1 to about 4 void times.

EXAMPLE 4

Determination of Dwell Pressure/Flow

As noted earlier, increasing the flow through the column during the isothermal dwell time is optional. The effect of increasing the flow is to flush the system more quickly because the void time of the column is reduced. This is more easily visualized by again considering the flushing time in terms of number of void times.

Figure 8:
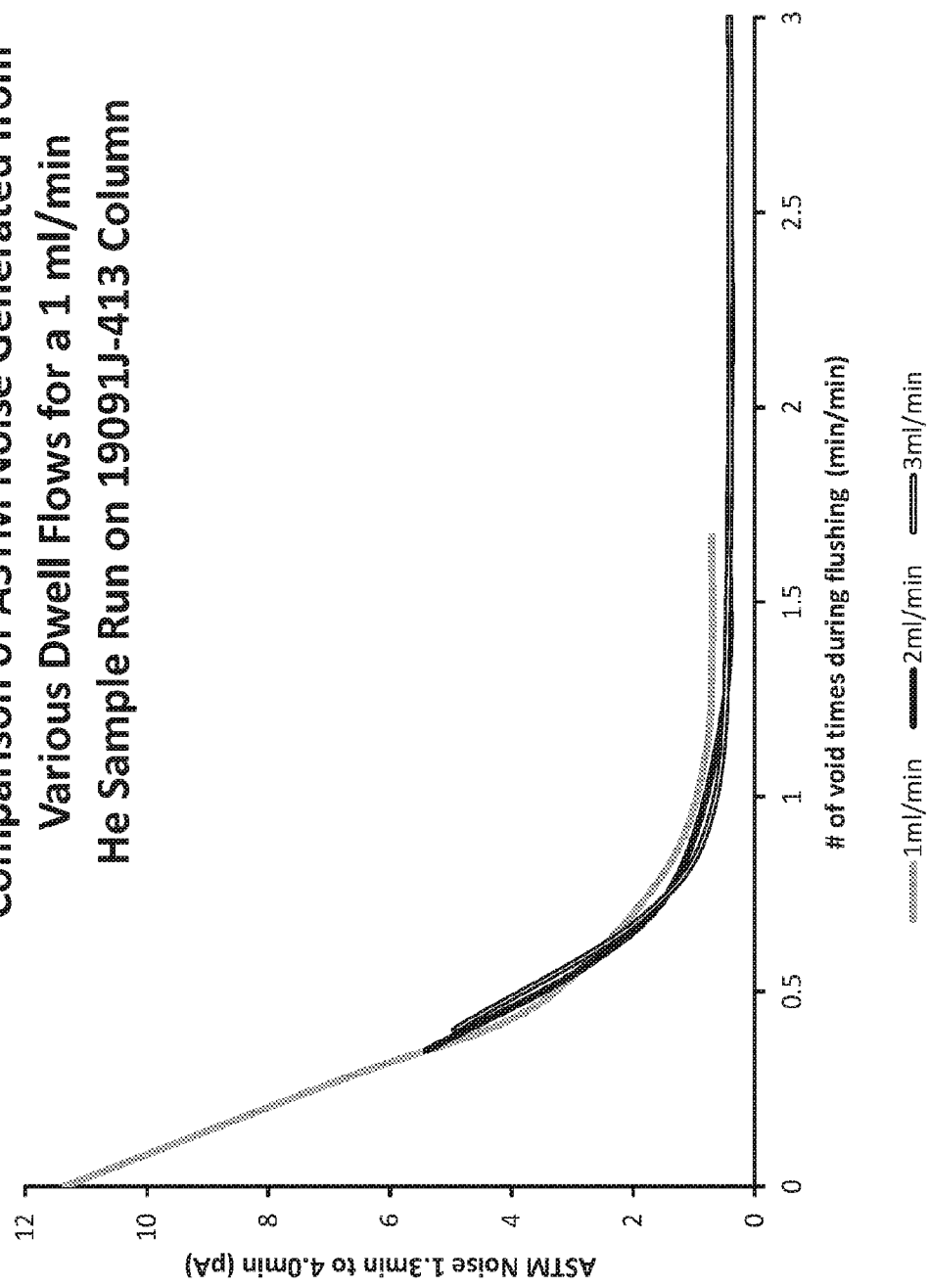
FIG. 8 is a set of plots of ASTM Noise as a function of number of column void times for three different flow rates according to another experiment.

FIG. 8 is a set of plots of ASTM Noise as a function of number of column void times for three different dwell flow rates. In this Example, an HP-5 320 μm×30 m×0.25 μm column was ramped from 65° C. to 350° C. at 150° C./min. The flow rate during the run was 1 ml/min of helium. After the run was completed, the column was cooled to a dwell temperature of 300° C. Once the isothermal dwell temperature was reached, the flow rate was increased to the values indicated on the curves of FIG. 8. Using an effective number of voids times calculated by averaging the flow profile over the flushing period, the noise curves can be shown to superimpose on each other. This means that for a flow rate of, for instance, 3 ml/min where the void time is approximately half of that at 1 ml/min, the same reduction in baseline noise can be achieved in half of the dwell time.

According to another embodiment, column bleed carryover may be mitigated by significantly reducing (slowing down), or even ceasing (stopping), column flow for a predetermined short period of time (e.g., around 15 to 30 seconds) that at least partially overlaps the period of time during which any form of cooling that would result in the production of column bleed and the development of a significant thermal gradient across the length of the column 108 occurs. This reduction in or ceasing of column flow may start at a point in time prior to the initiation of column cooling, and may end at a point in time occurring either while column cooling is still being implemented or after completion of column cooling. Reducing or ceasing the flow of carrier gas through the column 108 at such time may significantly reduce the mobility of the decomposition products so that they cannot redistribute unevenly in the column 108 during cooling. After cooling is complete (or the column temperature is low enough that the decomposition products continue to be immobile), the column flow may be resumed for conventional purposes such as purging the gas line in preparation for the next sample run. Carrier gas flow through portions of the GC system 100 other than the column 108, for example, the flow through a split vent trap or septum purge flow, does not necessarily need to be stopped or slowed down if such flow is controlled independently from the column flow. Additionally, the flow of gases through the detector 116 that is not also part of the column flow, such as the detector makeup flow, etc., likewise does not necessarily have to be stopped or slowed down.

Figure 9:
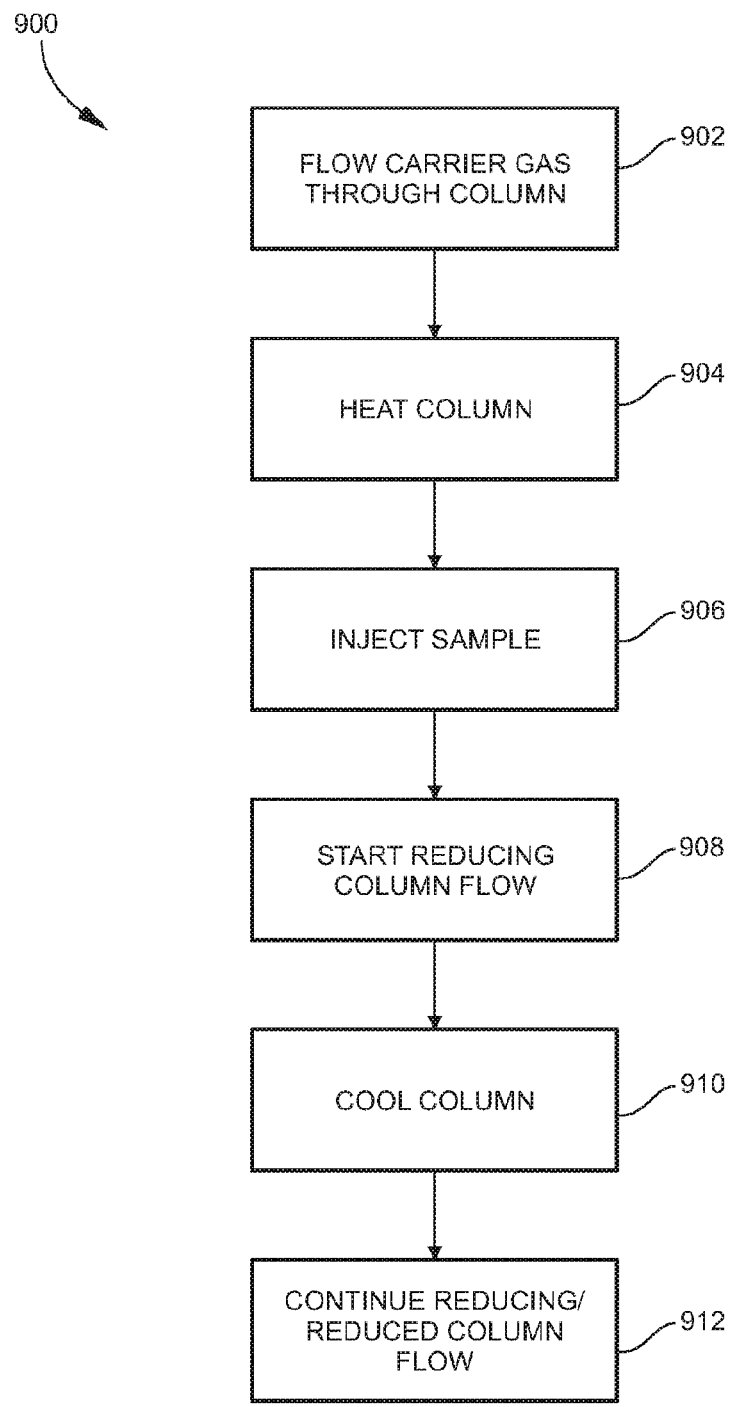
FIG. 9 is a flow diagram illustrating an example of a method for performing gas chromatography (GC) on a sample according to another embodiment.

FIG. 9 is a flow diagram 900 illustrating an example of a method for performing gas chromatography (GC) on a sample according to an embodiment of the present disclosure. As initial steps, a flow of carrier gas through a GC column is initiated at an initial (or first, or normal) flow rate (step 902), and heating of the GC column is initiated (step 904). Heating of the GC column, for example to some low temperature, may be initiated prior to the start of the flow of carrier gas through a GC column. Thus, the order in which steps 902 and 904 are shown in FIG. 9 is not intended to limit the order in which the carrier gas flow and the column heating are initiated. After the start of carrier gas flow and the column heating, the sample is then injected (step 906) into the flowing carrier gas to produce a mixture of the sample and the carrier gas, and the mixture is flowed through the GC column to a detector to acquire chromatographic data from the sample, during a period of time referred to herein as a sample run time. During the sample run time, the heating of the GC column may be performed so as to maintain the GC column at a predetermined temperature or to vary the column temperature according to a predetermined temperature profile, depending on the particular method being implemented.

Once the analysis is complete, the sample run time is followed by a predetermined period of time where the column flow is reduced from the initial flow rate down to a reduced (or second) flow rate (step 908) in order to reduce the mobility of stationary phase decomposition products prior to initiating column cooling. In some embodiments, the reduced flow rate may be a zero flow rate, i.e., reducing the flow rate may entail ceasing (stopping) the column flow altogether. This wait time of slowed or stopped flow is followed by a cooling time during which the GC column can be cooled (step 910). As described herein, cooling may be done passively or may be assisted by an active cooling process. The flow continues at a reduced rate or completely stopped for part or all of this cooling time (step 912) in order to ensure the decomposition products continue to have little mobility. Once cooling is complete, flow can return to its pre-run conditions if it has not been so returned already (e.g., the method may return to step 902).

The appropriate predetermined time to minimize the mobility of stationary phase decomposition products during cooling is a function of the column dimensions (e.g., inside diameter (ID) and length) as well as certain method parameters (e.g., carrier gas type, flow rate, column temperature). It can be determined experimentally. One method is to introduce a continuous flow of material into the carrier gas stream that the detector is sensitive to (e.g., methane for an FID). Once the flow is well established, the column pressure can be set to zero and the time for the baseline to show a downward step change corresponds to the minimum time required to slow down or stop the flow. Another option is to run a series of experiments observing the magnitude of the baseline disturbances for varying slow-down or stop times. For example, in an initial experiment the column flow remains at its normal level after each run, and the early baseline in successive runs is examined to discern the magnitude of the problem. In subsequent experiments, the time during which the column flow has been decreased or stopped is increased, and the effect on the run that follows each preceding run is observed. When the effect is sufficiently diminished, the time need not be further increased. As one non-limiting example, for a 30 m (length)×320 μm (ID)×0.25 μm (phase thickness) column, the required slow down or stop time is typically around 15 to 30 seconds.

As discussed above, an alternative to completely stopping the flow prior to an initial period of cooling to reduce the effects of column bleed is to slow down the flow prior to and during cooling. The flow has to be slowed enough to render the decomposition products reasonably immobile. Reducing the flow by 80% (i.e., down to 20% of the normal flow rate) has been shown to improve the effect of column bleed carryover significantly.

Ideally, for fast cooling ovens, the decomposition products should be substantially immobile when cooling begins. This requires that the inlet pressure at the head of the column be the same (or nearly the same) as the outlet pressure. For simple GC systems with one column connected on one end to an inlet and on the other to an atmospheric-pressure detector, this can be accomplished by setting the inlet pressure to zero gauge pressure (or near zero gauge pressure) or setting the flow controller to zero (or near zero). More complex systems, such as those involving post-column back-flush that have pressure control both on the inlet and outlet sides of the column, require that the pressure controller connected to the outlet of the column be set equal (or nearly equal) to the inlet pressure.

While not desirable because it increases cycle time, the ceasing or reduction of the column flow may be performed over a period of time. That is, the flow rate of the carrier gas through the column may be ramped down according to a predetermined reducing flow rate (e.g., about 30 mL/min/min) until the column flow reaches zero or the desired lower value rather than stopped or stepped down instantaneously. Again, this no-flow or reduced flow condition may be held for the predetermined period of time prior to and during cooling.

After the cooling time, i.e., after the GC column has been cooled down to a desired temperature, full flow can be restored (if not already restored during cooling) and the heating of the GC column may be resumed, i.e., steps 902 and 904 may be repeated in preparation for the next sample run. Thus, another sample may be injected (step 906) into the carrier gas stream, and the remaining steps of the method may be carried out as described herein. The method may be repeated for any number of additional sample runs, with column bleed carryover being minimized due to the control of the column flow during the column cooling time as described herein.

The flow diagram 900 illustrated in FIG. 9 may also represent an apparatus or system (e.g., a GC system) capable of performing the illustrated method. A controller of the apparatus or system, such as the controller 128 described herein and illustrated in FIG. 1, may be configured to perform (i.e., control other components of the apparatus or system to perform) all or part of one or more steps of the method. For example, the controller may be configured for controlling the carrier gas source to flow the carrier gas and the sample through the GC column and to the detector, controlling the heating device to heat the GC column to a predetermined temperature or according to a predetermined temperature profile during a sample run time, controlling the heating device to cease heating the GC column during a cooling time after flowing the carrier gas and the sample through the GC column and to the detector, controlling any active column cooling device provided, and controlling the carrier gas source to reduce or cease the flow of the carrier gas through the GC column at a predetermined start time and duration. The controller may also be configured for receiving a signal output from the detector to acquire chromatographic data from the sample during the sample run time.

Evaluations of the approach disclosed herein have demonstrated that peak-like features in the signal that would be attributed to elution and detection of decomposition products are eliminated or reduced in comparison to a conventional method in which the flow of carrier gas is not stopped or slowed during the cooling of the column 108.

EXAMPLE 5

An Agilent Technologies, Inc. model no. 19091J-413 column (320 µm ID×30 m×0.25 µm phase film thickness) was installed in a GC system consistent with that described above and illustrated in FIGS. 1 and 2, which was equipped with an FID. Carrier gas (helium) was run through the column at a constant flow rate of 3 mL/min with no sample material, i.e., the experimental runs evaluated in this Example were "blank" runs. The column was 30 m in length. Typically for a column of this length, the GC system would be programmed to execute a column temperature rise of less than 20 ° C./min. For this experiment, however, the GC system was programmed to execute an extremely fast column temperature rise of 150 ° C./min so as to exaggerate the column bleed carryover problem and thereby enhance the evaluation. Specifically, for each experimental run, while the helium was flowing through the column at 3 mL/min, the column temperature was held at 65° C. for 1 min, followed by ramping up the column temperature at the rate of 150 ° C./min to 315° C., followed by holding at 315° C. for 3 min, plus a period of time for pressure decay.

Figure 10:
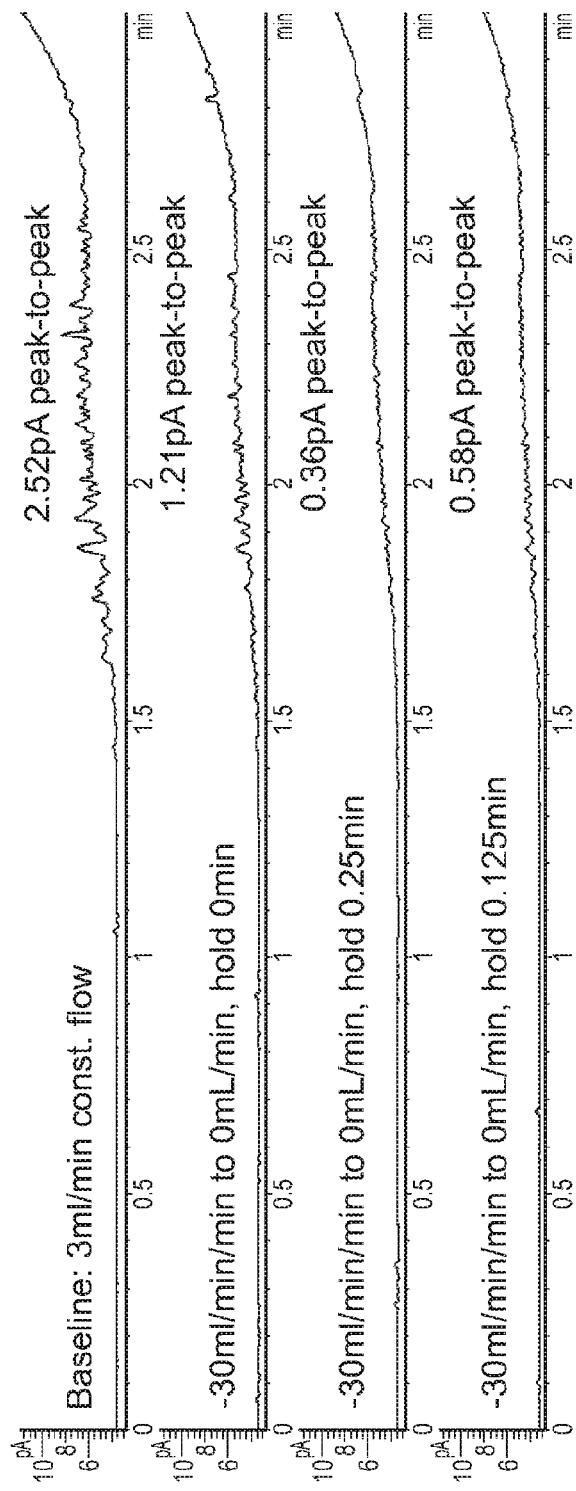
FIG. 10 is a set of chromatograms acquired for four different experimental runs according to an example described herein.

FIG. 10 is a set of chromatograms showing the effect on the baseline for the subsequent run from running a method as described above for four different pressure decay profiles. These are all blank runs (meaning no sample was injected) so that the detector baseline can be observed more easily. The FID signal, in picoamperes (pA), is traced as a function of elapsed time in minutes (min) in each subsequent run. The oscillations in the detector signal observed in the right regions of the chromatograms are indicative of the carryover problem and an approximate peak-to-peak measurement of the degree of oscillations is noted in each chromatogram. The uppermost chromatogram is the result of a "baseline" run in which the helium flow was not stopped at the end of the previous run, i.e., a conventional method run. The measured degree of oscillation in the detector signal was 2.52 pA peak-to-peak, as indicated in FIG. 10. The second, third, and fourth chromatograms are the results of decreasing the flow of helium at a rate of −30 (mL/min)/min down to 0 mL/min (no flow), followed by holding the no-flow condition (0 mL/min) for varying amounts of time before resuming helium flow. Specifically, the no-flow condition was held for 0 min, 0.25 min, and 0.125 min, respectively, as indicated in FIG. 10. The runs in which the helium flow was stopped yielded a measured detector signal of 1.21 pA peak-to-peak, 0.36 pA peak-to-peak, and 0.58 pA peak-to-peak, respectively, as indicated in FIG. 10. FIG. 10 thus demonstrates the adverse effects of column bleed, and the effectiveness of reducing and stopping the column flow prior to column cool-down in reducing column bleed carryover according to the method disclosed herein.

EXAMPLE 6

This Example utilized the same experimental conditions as noted above in Example 5, except that a more typical temperature rise of 10 ° C./min was programmed instead of 150 ° C./min.

Figure 11:
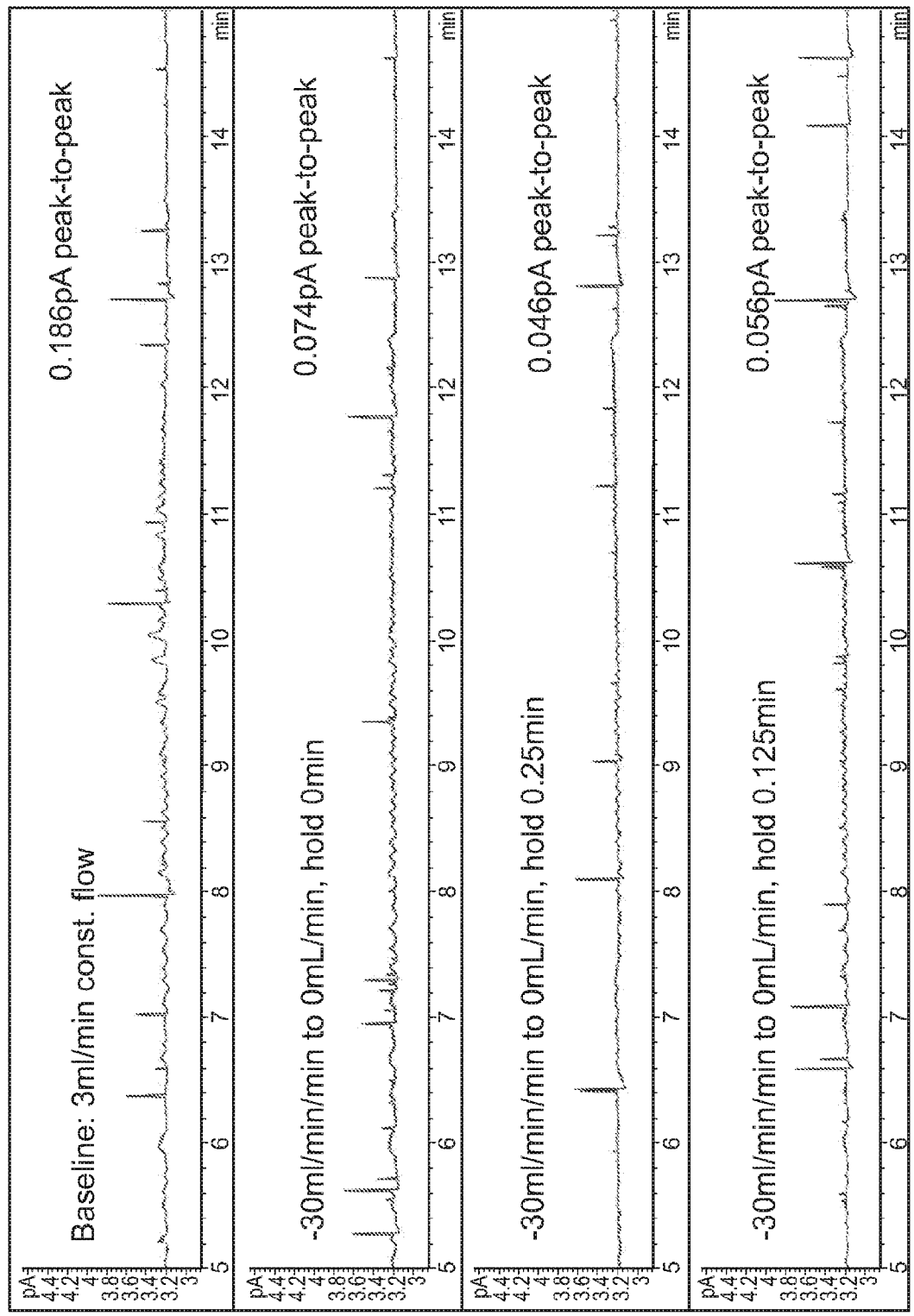
FIG. 11 is a set of chromatograms acquired for four different experimental runs according to another example described herein.

FIG. 11 is a set of chromatograms acquired for four different experimental runs under the conditions noted above. As in Example 5, the uppermost chromatogram is the result of a baseline run in which the helium flow was not stopped. The measured detector signal was 0.186 pA peakto-peak, as indicated in FIG. 11. As in Example 5, the second, third, and fourth chromatograms are the results of decreasing the flow of helium through the column at a rate of −30 (mL/min)/min down to 0 mL/min (no flow), followed by holding the no-flow condition (0 mL/min) for 0 min, 0.25 min, and 0.125 min, respectively, as indicated in FIG. 11. The runs in which the helium flow was stopped yielded a measured detector signal of 0.074 pA peak-to-peak, 0.046 pA peak-to-peak, and 0.056 pA peak-to-peak, respectively, as indicated in FIG. 11. FIG. 11 thus further demonstrates the adverse effects of column bleed, and the effectiveness of reducing and stopping the flow of carrier gas through the column during column cool-down in reducing column bleed carryover according to the method disclosed herein.

EXAMPLE 7

This Example utilized the same experimental conditions as noted above in Example 5.

Figure 12:
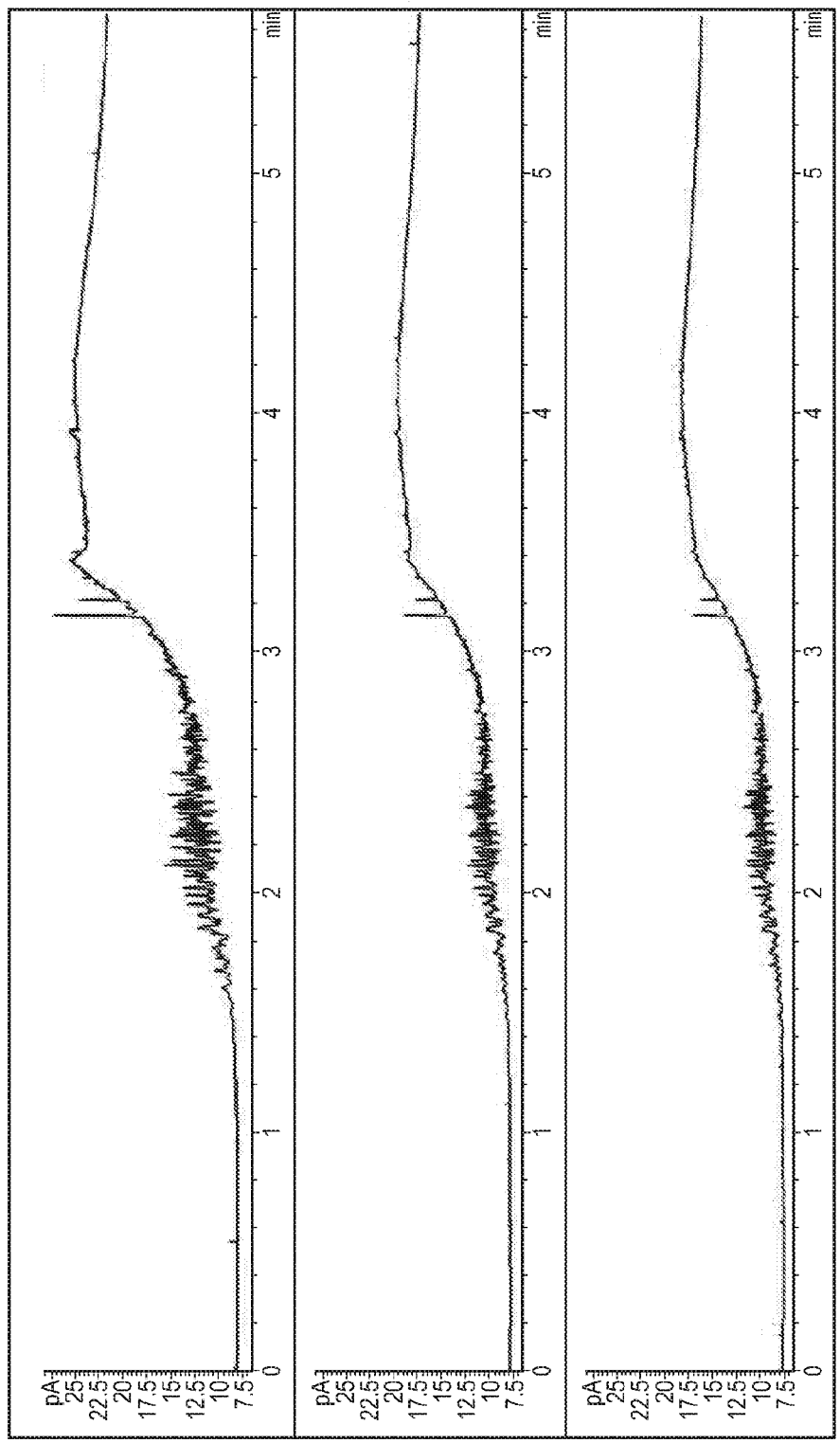
FIG. 12 is a set of chromatograms acquired for three different experimental runs according to another example described herein.

FIG. 12 is a set of chromatograms acquired for three different experimental runs under the conditions noted above. As in Example 5, the uppermost chromatogram is the result of a baseline run in which the helium flow was not slowed, remaining 3 mL/min during and after the run. The measured detector signal was 5.1 pA peak-to-peak. In the second and third chromatograms, the flow of He was slowed to 0.5 mL/min and 0.1 mL/min, respectively, for 0.5 mins after the end of the run and before cooling was initiated. The runs in which the helium flow was slowed yielded a measured detector signal of 3.2 pA peak-to-peak and 3.2 pA peak-to-peak, respectively. FIG. 12 thus further demonstrates the adverse effects of column bleed, and the effectiveness of reducing the flow of carrier gas through the column prior to and during column cool-down in reducing column bleed carryover and its adverse effects, according to the method disclosed herein.

Exemplary Embodiments

Exemplary embodiments provided in accordance with the presently disclosed subject matter include, but are not limited to, the following:

1. A method for performing gas chromatography (GC) on a sample, the method comprising: flowing a carrier gas through a GC column; during a sample run time, heating the GC column according to a heating program, the heating program comprising increasing a column temperature of the GC column from an initial temperature to a final temperature; during the sample run time, injecting the sample into the flowing carrier gas to produce a mixture of the sample and the carrier gas, and flowing the mixture through the GC column; and after the sample run time, cooling the GC column according to a cooling program, the cooling program comprising: decreasing the column temperature from the final temperature to a dwell temperature; holding the column temperature at the dwell temperature for an isothermal dwell time; and after the isothermal dwell time, decreasing the column temperature from the dwell temperature to the initial temperature.

2. The method of embodiment 1, wherein the dwell temperature is a temperature cool enough to substantially avoid decomposition of a stationary phase of the GC column phase and warm enough to promote flushing away of decomposition products existing in the GC column prior to the sample run time.

3. The method of embodiment 1, wherein the dwell temperature is in a range from about 20° C. to about 100° C. below the final temperature.

4. The method of embodiment 1, wherein the isothermal dwell time is a period of time effective to allow decomposition products existing in the GC column prior to the sample run time to be flushed from the GC column.

5. The method of embodiment 1, comprising defining a flushing time as the sum of a duration over which decreasing the column temperature from the final temperature to the dwell temperature occurs and the isothermal dwell time, wherein the flushing time is selected from the group consisting of: a period of time in a range from about 1 time to about 4 times a void time of the GC column; and a period of time in a range of about 1 minute to 5 minutes.

6. The method of embodiment 1, wherein decreasing the column temperature from the final temperature to the dwell temperature, or decreasing the column temperature from the dwell temperature to the initial temperature, or both of the foregoing, is done at a cooling rate in a range from 100° C./min to 1000 ° C./min.

7. The method of embodiment 1, wherein decreasing the column temperature from the final temperature to the dwell temperature is done at a first cooling rate, decreasing the column temperature from the dwell temperature to the initial temperature is done at a second cooling rate, and the first cooling rate is greater than the second cooling rate.

8. The method of embodiment 1, comprising, at or after a start time of holding the column temperature at the dwell temperature for the isothermal dwell time, increasing a column flow rate from an initial flow rate to an elevated flow rate, and holding the column flow rate at the elevated flow rate for a flow rate hold time spanning at least a portion of the isothermal dwell time.

9. The method of embodiment 8, wherein increasing the column flow rate comprises increasing a column inlet pressure.

10. The method of embodiment 1, comprising, during the sample run time, flowing the mixture from the GC column to a detector to acquire chromatographic data from the sample.

11. The method of embodiment 1, wherein cooling the GC column according to the cooling program is performed after analytes of interest have eluted from the column.

12. A gas chromatography (GC) system, comprising: a GC column; a carrier gas source configured for flowing a mixture of a sample and a carrier gas through the GC column; a heating device configured for heating the GC column; and a controller configured for: controlling the carrier gas source to flow the mixture through the GC column during a sample run time; controlling the heating device to heat the GC column during the sample run time according to a heating program, the heating program comprising increasing a column temperature of the GC column from an initial temperature to a final temperature; and controlling the heating device to cool the GC column after the sample run time according to a cooling program, the cooling program comprising: decreasing the column temperature from the final temperature to a dwell temperature; holding the column temperature at the dwell temperature for an isothermal dwell time; and after the isothermal dwell time, decreasing the column temperature from the dwell temperature to the initial temperature.

13. The GC system of embodiment 12, wherein the controller is configured for maintaining the dwell temperature in a range from about 20° C. to about 100° C. below the final temperature.

14. The GC system of embodiment 12, wherein a flushing time is defined as the sum of a duration over which decreasing the column temperature from the final temperature to the dwell temperature occurs and the isothermal dwell time, wherein the controller is configured for controlling the heating device such that the flushing time is selected from the group consisting of: a period of time in a range from about 1 time to about 4 times a void time of the GC column; and a period of time in a range of about 1 minute to 5 minutes.

15. The GC system of embodiment 12, wherein the controller is configured for controlling the heating device such that decreasing the column temperature from the final temperature to the dwell temperature, or decreasing the column temperature from the dwell temperature to the initial temperature, or both of the foregoing, is done at a cooling rate in a range from 100° C./min to 1000 ° C./min.

16. The GC system of embodiment 12, wherein the controller is configured for controlling the heating device such that decreasing the column temperature from the final temperature to the dwell temperature is done at a first cooling rate, decreasing the column temperature from the dwell temperature to the initial temperature is done at a second cooling rate, and the first cooling rate is greater than the second cooling rate.

17. The GC system of embodiment 12, wherein the controller is configured for: at or after a start time of holding the column temperature at the dwell temperature for the isothermal dwell time, increasing a column flow rate from an initial flow rate to an elevated flow rate, and holding the flow rate at the elevated flow rate for a flow rate hold time spanning at least a portion of the isothermal dwell time.

18. The GC system of embodiment 12, comprising a cooling device configured for actively cooling the GC column, wherein the controller is configured for controlling the cooling device to cool the GC column after the sample run time according to the cooling program.

19. The GC system of embodiment 12, comprising a component selected from the group consisting of: an injector configured for injecting the sample into a flow of the carrier gas to produce the mixture; a detector configured for detecting analytes of the mixture flowing from the column outlet; and both of the foregoing.

20. The GC system of embodiment 12, comprising a detector configured for detecting analytes of the mixture flowing from the column outlet, wherein the controller is configured for receiving a signal output from the detector to acquire chromatographic data from the sample.

21. A non-transitory computer-readable medium with instructions stored thereon, that when executed by a processor, control or perform cooling the GC column according to the method of embodiment 1.

22. A method for performing gas chromatography (GC) on a sample, the method comprising: flowing a carrier gas through a GC column; during a sample run time, heating the GC column to a predetermined temperature or according to a predetermined temperature profile; during the sample run time, injecting the sample into the flowing carrier gas to produce a mixture of the sample and the carrier gas, and flowing the mixture through the GC column; after the sample run time, cooling the GC column during a cooling time; and during at least an initial portion of the cooling time, reducing or ceasing the flowing of the carrier gas through the GC column.

23. The method of embodiment 22, comprising starting to reduce or cease the flowing of the carrier gas through the GC column before cooling the GC column.

24. The method of embodiment 22, wherein the mixture flows through the GC column at an initial flow rate prior to reducing or ceasing the flowing of the carrier gas through the GC column, and further comprising, after a predetermined portion of the cooling time, resuming the flowing of the carrier gas through the GC column at the initial flow rate.

25. The method of embodiment 22, wherein the mixture flows through the GC column at an initial flow rate prior to reducing or ceasing the flowing of the carrier gas through the GC column, and further comprising, during the cooling time, cooling the GC column down to at least a predetermined lowered column temperature, and subsequently resuming flowing the carrier gas through the GC column at the initial flow rate.

26. The method of embodiment 22, wherein reducing or ceasing the flowing of the carrier gas comprises decreasing a flow rate of the carrier gas until the flow rate is at a predetermined lowered flow rate or zero flow rate, and holding the flow rate at the lowered flow rate or zero flow rate for a period of time equal to zero minutes or greater.

27. A gas chromatography (GC) system, comprising: a GC column; a carrier gas source configured for flowing a mixture of a sample and a carrier gas through the GC column; a heating device configured for heating the GC column; and a controller configured for: controlling a carrier gas source to flow the mixture through the GC column and to the detector; controlling the heating device to heat the GC column to a predetermined temperature or according to a predetermined temperature profile during a sample run time; after the sample run time, controlling the heating device to cease heating the GC column during a cooling time; and controlling the carrier gas source, or a flow regulator between the carrier gas source and the GC column, to reduce or cease flowing the carrier gas through the GC column during at least an initial portion of the cooling time.

28. The GC system of embodiment 27, wherein the controller is configured for starting to reduce or cease the flowing of the carrier gas through the GC column before cooling the GC column.

29. The GC system of embodiment 27, comprising a cooling device configured for actively cooling the GC column, wherein the controller is configured for controlling the cooling device to cool the GC column during the cooling time.

30. The GC system of embodiment 27, comprising a component selected from the group consisting of: an injector configured for injecting the sample into a flow of the carrier gas to produce the mixture; a detector configured for detecting analytes of the mixture flowing from the column outlet; and both of the foregoing.

31. The GC system of embodiment 27, comprising a detector configured for detecting analytes of the mixture flowing from the column outlet, wherein the controller is configured for receiving a signal output from the detector to acquire chromatographic data from the sample.

32. A non-transitory computer-readable medium with instructions stored thereon, that when executed by a processor, control or perform reducing or ceasing the flowing of the carrier gas through the GC column according to the method of embodiment 22.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the system controller 128 schematically depicted in FIG. 1. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), or application specific integrated circuits (ASICs). Further, the schematic diagrams describe a logical division of functions having physical (hardware and/or software) implementations that are not limit& by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the system controller 128 in FIG. 1), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" or "in electrical communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for performing gas chromatography (GC) on a sample, the method comprising:
    flowing a carrier gas through a GC column;
    during a sample run time, heating the GC column according to a heating program, the heating program comprising increasing a column temperature of the GC column from an initial temperature to a final temperature;
    during the sample run time, injecting the sample into the flowing carrier gas to produce a mixture of the sample and the carrier gas, and flowing the mixture through the GC column; and
    after the sample run time, cooling the GC column according to a cooling program, the cooling program comprising:
    decreasing the column temperature from the final temperature to a dwell temperature;
    holding the column temperature at the dwell temperature for an isothermal dwell time; and
    after the isothermal dwell time, decreasing the column temperature from the dwell temperature to the initial temperature.

2. The method of claim 1, wherein the dwell temperature is a temperature cool enough to substantially avoid decomposition of a stationary phase of the GC column phase and warm enough to promote flushing away of decomposition products existing in the GC column prior to the sample run time.

3. The method of claim 1, wherein the dwell temperature is in a range from about 20° C. to about 100° C. below the final temperature.

4. The method of claim 1, wherein the isothermal dwell time is a period of time effective to allow decomposition products existing in the GC column prior to the sample run time to be flushed from the GC column.

5. The method of claim 1, comprising defining a flushing time as the sum of a duration over which decreasing the column temperature from the final temperature to the dwell temperature occurs and the isothermal dwell time, wherein the flushing time is selected from the group consisting of: a period of time in a range from about 1 time to about 4 times a void time of the GC column; and a period of time in a range of about 1 minute to 5 minutes.

6. The method of claim 1, wherein decreasing the column temperature from the final temperature to the dwell temperature, or decreasing the column temperature from the dwell temperature to the initial temperature, or both of the foregoing, is done at a cooling rate in a range from 100° C./min to 1000° C./min.

7. The method of claim 1, wherein decreasing the column temperature from the final temperature to the dwell temperature is done at a first cooling rate, decreasing the column temperature from the dwell temperature to the initial temperature is done at a second cooling rate, and the first cooling rate is greater than the second cooling rate.

8. The method of claim 1, comprising, at or after a start time of holding the column temperature at the dwell temperature for the isothermal dwell time, increasing a column flow rate from an initial flow rate to an elevated flow rate, and holding the column flow rate at the elevated flow rate for a flow rate hold time spanning at least a portion of the isothermal dwell time.

9. The method of claim 8, wherein increasing the column flow rate comprises increasing a column inlet pressure.

10. The method of claim 1, comprising, during the sample run time, flowing the mixture from the GC column to a detector to acquire chromatographic data from the sample.

11. The method of claim 1, wherein cooling the GC column according to the cooling program is performed after analytes of interest have eluted from the column.

12. A non-transitory computer-readable medium with instructions stored thereon, that when executed by a processor, control or perform cooling the GC column according to the method of claim 1.

13. A gas chromatography (GC) system, comprising:
a GC column;
a carrier gas source configured for flowing a mixture of a sample and a carrier gas through the GC column;
a heating device configured for heating the GC column; and
a controller configured for:
controlling the carrier gas source to flow the mixture through the GC column during a sample run time;
controlling the heating device to heat the GC column during the sample run time according to a heating program, the heating program comprising increasing a column temperature of the GC column from an initial temperature to a final temperature; and
controlling the heating device to cool the GC column after the sample run time according to a cooling program, the cooling program comprising:
decreasing the column temperature from the final temperature to a dwell temperature;
holding the column temperature at the dwell temperature for an isothermal dwell time; and
after the isothermal dwell time, decreasing the column temperature from the dwell temperature to the initial temperature.

14. The GC system of claim 13, wherein the controller is configured for maintaining the dwell temperature in a range from about 20° C. to about 100° C. below the final temperature.

15. The GC system of claim 13, wherein a flushing time is defined as the sum of a duration over which decreasing the column temperature from the final temperature to the dwell temperature occurs and the isothermal dwell time, wherein the controller is configured for controlling the heating device such that the flushing time is selected from the group consisting of: a period of time in a range from about 1 time to about 4 times a void time of the GC column; and a period of time in a range of about 1 minute to 5 minutes.

16. The GC system of claim 13, wherein the controller is configured for controlling the heating device such that decreasing the column temperature from the final temperature to the dwell temperature, or decreasing the column temperature from the dwell temperature to the initial temperature, or both of the foregoing, is done at a cooling rate in a range from 100° C./min to 1000° C./min.

17. The GC system of claim 13, wherein the controller is configured for controlling the heating device such that decreasing the column temperature from the final temperature to the dwell temperature is done at a first cooling rate, decreasing the column temperature from the dwell temperature to the initial temperature is done at a second cooling rate, and the first cooling rate is greater than the second cooling rate.

18. The GC system of claim 13, wherein the controller is configured for:
at or after a start time of holding the column temperature at the dwell temperature for the isothermal dwell time, increasing a column flow rate from an initial flow rate to an elevated flow rate, and holding the flow rate at the elevated flow rate for a flow rate hold time spanning at least a portion of the isothermal dwell time.

19. The GC system of claim 13, comprising a cooling device configured for actively cooling the GC column, wherein the controller is configured for controlling the cooling device to cool the GC column after the sample run time according to the cooling program.

* * * * *